US011354075B2

(12) United States Patent
Inoue et al.

(10) Patent No.: US 11,354,075 B2
(45) Date of Patent: Jun. 7, 2022

(54) NON-TRANSITORY COMPUTER-READABLE MEDIUM STORING COMPUTER-READABLE INSTRUCTIONS THAT CAUSE PROCESSOR OF PRINT IMAGE CONTROL DEVICE TO SET PRINT POSITION, PRINT IMAGE CONTROL DEVICE THAT SETS PRINT POSITION, AND CONTROL METHOD OF PRINT IMAGE CONTROL DEVICE THAT SETS PRINT POSITION

(71) Applicant: BROTHER KOGYO KABUSHIKI KAISHA, Nagoya (JP)

(72) Inventors: Chisato Inoue, Nagoya (JP); Takeshi Watanabe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/832,929

(22) Filed: Mar. 27, 2020

(65) Prior Publication Data
US 2020/0310703 A1 Oct. 1, 2020

(30) Foreign Application Priority Data

Mar. 29, 2019 (JP) .............................. JP2019-067470
Mar. 29, 2019 (JP) .............................. JP2019-067472
(Continued)

(51) Int. Cl.
G06F 3/12 (2006.01)
H04N 1/00 (2006.01)
(Continued)

(52) U.S. Cl.
CPC ............ G06F 3/125 (2013.01); G06F 3/1204 (2013.01); G06F 3/1208 (2013.01);
(Continued)

(58) Field of Classification Search
None
See application file for complete search history.

(56) References Cited

U.S. PATENT DOCUMENTS 9,594,455 B2 3/2017 Tamura et al.
9,656,492 B2 5/2017 Leynadier et al.
(Continued)

FOREIGN PATENT DOCUMENTS

EP 2843933 A1 3/2015
JP 2005-045644 A 2/2005
(Continued)

OTHER PUBLICATIONS

New U.S. patent application claiming priority to JP Applications No. 2019-067470, 2019-067472, 2019-067482, 2019-067486 and 2019-067493, being filed concurrently with the United States Patent and Trademark Office.

(Continued)

Primary Examiner — Henok Shiferaw
(74) Attorney, Agent, or Firm — K&L Gates LLP

(57) ABSTRACT

Provided are a non-transitory computer-readable medium, a print image control device, and a control method of the print image control device capable of reducing time required for an operation to adjust a position of a print image, and of improving productivity. A CPU performs part specification command input processing in which a command is input to specify a part of a photographic image captured by a camera, characteristic identification processing that identifies a characteristic of fabric on the basis of the command input by the part specification command input processing, generated graphic generation processing that generates a generated graphic relating to the characteristic identified by the characteristic identification processing, and display control processing that controls a display such that the generated graphic generated by the generated graphic generation pro- (Continued)

cessing is displayed along with the photographic image and a print image.

17 Claims, 38 Drawing Sheets

(30) Foreign Application Priority Data

Mar. 29, 2019 (JP) .............................. JP2019-067482
Mar. 29, 2019 (JP) .............................. JP2019-067486
Mar. 29, 2019 (JP) .............................. JP2019-067493

(51) Int. Cl.
    *H04N 1/60*     (2006.01)
    *G06K 15/02*     (2006.01)
    *B41J 3/407*     (2006.01)

(52) U.S. Cl.
    CPC .......... *G06F 3/1242* (2013.01); *G06F 3/1256* (2013.01); *G06F 3/1284* (2013.01); *H04N 1/00251* (2013.01); *H04N 1/00267* (2013.01); *H04N 1/00442* (2013.01); *H04N 1/00474* (2013.01); *H04N 1/6097* (2013.01); *B41J 3/4078* (2013.01); *G06K 15/021* (2013.01); *H04N 1/0019* (2013.01); *H04N 1/00204* (2013.01); *H04N 2201/0084* (2013.01)

(56) References Cited

U.S. PATENT DOCUMENTS

| | | | | |
|---|---|---|---|---|
| 9,667,822 | B2* | 5/2017 | Kaieda | ............... H04N 1/00721 |
| 9,840,099 | B2 | 12/2017 | Honobe et al. | |
| 2004/0239705 | A1* | 12/2004 | Arikita | ................... B41J 3/4078 |
| | | | | 347/5 |
| 2013/0278695 | A1* | 10/2013 | Yanagishita | ............. B41J 11/02 |
| | | | | 347/104 |
| 2014/0029030 | A1* | 1/2014 | Miller | ................... B41J 3/4078 |
| | | | | 358/1.12 |
| 2014/0029930 | A1 | 1/2014 | Miller | |
| 2016/0292546 | A1* | 10/2016 | Yamashita | .......... G06K 15/1843 |
| 2018/0220112 | A1 | 8/2018 | Miichi et al. | |
| 2019/0193424 | A1* | 6/2019 | Tamaki | .............. D06B 11/0059 |
| 2019/0248129 | A1* | 8/2019 | Drees | ...................... B41F 16/02 |
| 2020/0314260 | A1* | 10/2020 | Inoue | ................. H04N 1/00175 |

FOREIGN PATENT DOCUMENTS

| | | |
|---|---|---|
| JP | 2006-076099 A | 3/2006 |
| JP | 2006174053 A | 6/2006 |
| JP | 2008140044 A | 6/2008 |
| JP | 2013-023777 A | 2/2013 |
| JP | 2014206952 A | 10/2014 |
| JP | 2015134410 A | 7/2015 |
| JP | 2016-107474 A | 6/2016 |
| JP | 2016525025 A | 8/2016 |
| JP | 2016-177731 A | 10/2016 |
| JP | 2016182719 A | 10/2016 |
| JP | 2016225689 A | 12/2016 |
| JP | 6206282 B2 | 10/2017 |
| WO | 2017033384 A1 | 3/2017 |

OTHER PUBLICATIONS

Extended European Search Report issued in EP Application No. 20162774.9, dated Sep. 1, 2020.
Extended European Search Report issued in EP Application No. 20165774.9, dated Sep. 1, 2020.
Japanese Office Action dated Mar. 1, 2022, in corresponding Japanese Patent Application No. 2019-067470 (12 pages).
Japanese Office Action dated Mar. 1, 2022, in corresponding Japanese Patent Application No. 2019-067472 (8 pages).
Japanese Office Action dated Mar. 1, 2022, in corresponding Japanese Patent Application No. 2019-067482 (9 pages).
Japanese Office Action dated Mar. 1, 2022, in corresponding Japanese Patent Application No. 2019-067486 (10 pages).
Japanese Office Action dated Mar. 1, 2022, in corresponding Japanese Patent Application No. 2019-067493 (17 pages).

* cited by examiner

NON-TRANSITORY COMPUTER-READABLE
MEDIUM STORING
COMPUTER-READABLE INSTRUCTIONS
THAT CAUSE PROCESSOR OF PRINT
IMAGE CONTROL DEVICE TO SET PRINT
POSITION, PRINT IMAGE CONTROL
DEVICE THAT SETS PRINT POSITION, AND
CONTROL METHOD OF PRINT IMAGE
CONTROL DEVICE THAT SETS PRINT
POSITION

CROSS-REFERENCE TO RELATED
APPLICATION

This application claims priority to Japanese Patent Application No. 2019-67470 filed Mar. 29, 2019, Japanese Patent Application No. 2019-67472 filed Mar. 29, 2019, Japanese Patent Application No. 2019-67482 filed Mar. 29, 2019, Japanese Patent Application No. 2019-67486 filed Mar. 29, 2019, and Japanese Patent Application No. 2019-67493 filed Mar. 29, 2019. The contents of the foregoing application are hereby incorporated herein by reference.

BACKGROUND

The present disclosure relates to a non-transitory computer-readable medium, a print image control device, and a control method of a print image control device.

A projection system is proposed in which a projector is provided on a printer, and a print image to be formed on an object to be printed can be verified using an image projected onto the object to be printed.

SUMMARY

A printer is known that performs printing on an object to be printed, such as fabric or the like. In the cutting, sewing, and bonding of the fabric, since the fabric is not a rigid body, variations occur. Thus, the object to be printed configured by the fabric is not always completely the same. Further, when placing the object to be printed configured by the fabric on a support member, the fabric stretches. Thus, a state in which the object to be printed configured by the fabric is placed on the support member is not always the same. Further, the object to be printed configured by the fabric has various characteristics, and a print image may be arranged using those characteristics as indicators. An example of the above-mentioned characteristics is a pocket of clothing. The pocket is formed by sewing a separate cloth onto a cloth that is a body portion. In other words, a small cloth is layered on a large cloth. There is a case in which the print image is printed on the cloth forming the pocket. As described above, since the object to be printed itself is not always the same, and a placement state is also not always the same, the pocket itself and the placement state are not completely the same. Thus, there is a problem in that time is required for a user to adjust a position of the print image for each of placement states of the object to be printed configured from the fabric on the support member, and productivity deteriorates.

Embodiments of the broad principles derived herein provide a non-transitory computer-readable medium, a print image control device, and a control method of the print image control device capable of reducing time of an operation to adjust a position of a print image, and of improving productivity.

A non-transitory computer-readable medium according to a first aspect of the present disclosure causes a processor of a print image control device, which sets a print position relating to a print image printed by a printing portion of a printer onto an object to be printed supported by a support member that moves between the print position in which the support member faces the printing portion and a stand-by position in which the support member does not face the printing portion, to perform processes including: performing part specification command input processing in which a command is input specifying a part of a photographic image captured by an image capture device that captures an image of the object to be printed supported by the support member in the stand-by position; performing characteristic identification processing that identifies a characteristic of the object to be printed on the basis of the command input by the part specification command input processing; performing generated graphic generation processing that generates a generated graphic relating to the characteristic identified by the characteristic identification processing; and performing display control processing that displays, on a display portion, the generated graphic generated by the generated graphic generation processing, along with at least one of the photographic image and the print image.

In this case, along with the photographic image and the print image, the generated graphic relating to the characteristic of the object to be printed is displayed on the display portion. Thus, the generated graphic is a marker relating to the setting of a position of the print image, and a user can easily verify a relative position of the print image with respect to the characteristic of the object to be printed. As a result, even if the object to be printed is configured by a fabric, a time required for an operation to adjust the position of the print image can be reduced, and a deterioration in productivity is reduced.

A print image control device according to a second aspect of the present disclosure is a print image control device that sets a print position relating to a print image printed by a printing portion of a printer onto an object to be printed supported by a support member that moves between the print position in which the support member faces the printing portion and a stand-by position in which the support member does not face the printing portion. The print image control device includes a control portion, which performs processes including: performing part specification command input processing in which a command is input specifying a part of a photographic image captured by an image capture device that captures an image of the object to be printed supported by the support member in the stand-by position; performing characteristic identification processing that identifies a characteristic of the object to be printed on the basis of the command input by the part specification command input processing; performing generated graphic generation processing that generates a generated graphic relating to the characteristic identified by the characteristic identification processing; and performing display control processing that displays, on a display portion, the generated graphic generated by the generated graphic generation processing, along with at least one of the photographic image and the print image.

A control method of a print image control device according to a third aspect of the present disclosure is a control method controlling a print image control device that sets a print position relating to a print image printed by a printing portion of a printer onto an object to be printed supported by a support member that moves between the print position in which the support member faces the printing portion and a stand-by position in which the support member does not face the printing portion. The control method performs processes including: performing part specification command input processing in which a command is input specifying a part of a photographic image captured by an image capture device that captures an image of the object to be printed supported by the support member in the stand-by position; performing characteristic identification processing that identifies a characteristic of the object to be printed on the basis of the command input by the part specification command input processing; performing generated graphic generation processing that generates a generated graphic relating to the characteristic identified by the characteristic identification processing; and performing display control processing that displays, on a display portion, the generated graphic generated by the generated graphic generation processing, along with at least one of the photographic image and the print image.

BRIEF DESCRIPTION OF THE DRAWINGS

Embodiments will be described below in detail with reference to the accompanying drawings in which.

DETAILED DESCRIPTION

Figure 1:
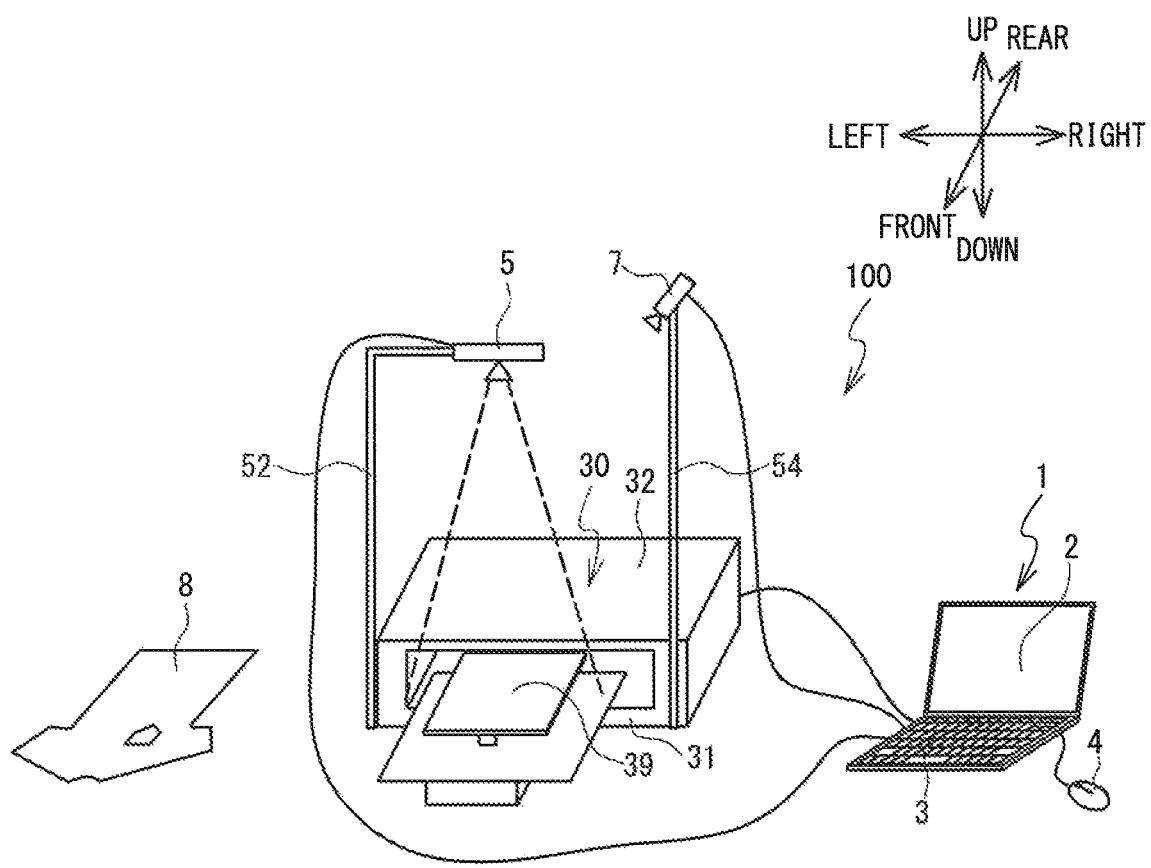
FIG. 1 is a diagram showing an overview of a print image system 100.

As shown in FIG. 1, a print image system 100 is provided with a personal computer (hereinafter referred to as a "PC") 1 (refer to FIG. 3), a projector 5, and a camera 7. The PC 1 controls a printer 30 as well as supplying data of a print image 60 (refer to FIG. 7A) to the printer 30. The PC 1 can create projection data. The projection data is data to project a projection image representing an image for printing onto an object to be printed on which the print image 60 is to be formed by the printer 30. A photographic image captured by the camera 7 is input to the PC 1, and creates a generated image to be described later.

The printer 30 performs printing by ejecting ink supplied from a cartridge (not shown in the drawings) from a head 35 (refer to FIG. 2) onto the object to be printed, which is paper, a fabric 8 such as a T-shirt, or the like. The upward direction, the downward direction, the rightward direction, the leftward direction, the upper right direction, and the lower left direction in FIG. 1 respectively correspond to an upward direction, a downward direction, a leftward direction, a rightward direction, a rear direction, and a front direction of the printer 30.

The printer 30 is provided with a substantially cuboid-shaped main body portion 32, a base 31, and a cartridge mounting portion (not shown in the drawings) in which a cartridge (not shown in the drawings) is mounted. The main body portion 32 is a known portion that performs printing by causing scanning of the ink head 35 while conveying a platen 39 on which the fabric 8 is placed. The base 31 is a portion forming a base of a lower portion of the printer 30.

The platen 39 is provided in a center portion, in the left-right direction, of the main body portion 32. The platen 39 is provided with a placement surface on the upper surface thereof, on which the fabric 8 is placed. The platen 39 is conveyed in the front-rear direction by a sub-scanning motor 47 (refer to FIG. 2). The placement surface of the platen 39 is positioned in a location separated from the base 31.

The projector 5, which is a projection device, is supported by a support portion 52, above and on the front side of the main body portion 32. The projector 5 may be a general-purpose projector. The projector 5 is provided so as to be able to project the projection image onto the object to be printed placed on the platen 39. FIG. 1 shows a state in which the projection image is projected onto the platen 39 from the projector 5. The support portion 52 supports the projector 5 above the upper surface of the platen 39. As will be described in more detail later, the projector 5 and the upper surface of the platen 39 are separated such that a projection region over which the projection image is projected onto the platen 39 by the projector 5 is larger than the print image 60 that can be formed on the object to be printed by the printer 30. The projector 5 projects the projection image from diagonally above the object to be printed, and thus, as processing performed by the projector 5, it is assumed that processing to correct image distortion is performed on the projection image.

The camera 7, which is an image capture device, is supported by a support portion 54, above and on the front side of the right end side of the main body portion 32. The camera 7 may be a general-purpose digital camera or the like. The camera 7 is positioned in a location separated from the base 31 of the printer 30, and is provided facing the platen 39 supporting the fabric 8, and is able to capture an image of the object to be printed placed on the platen 39. The camera 7 can acquire the photographic image.

Electrical Configuration of Printer 30

Figure 2:
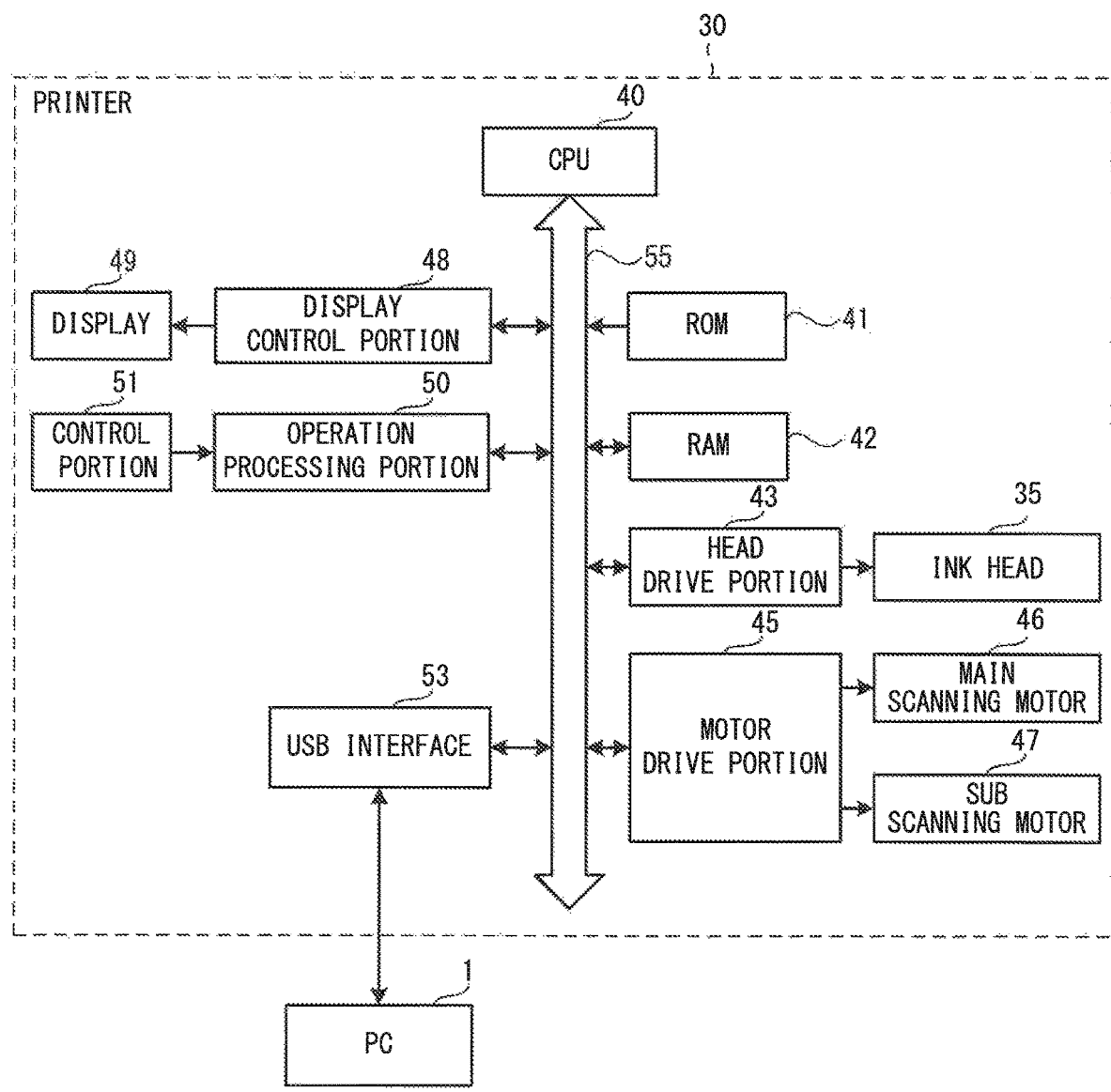
FIG. 2 is a block diagram showing an electrical configuration of a printer 30.

An electrical configuration of the printer 30 will be explained with reference to FIG. 2. The printer 30 is provided with a CPU 40 that controls the printer 30. A ROM 41, a RAM 42, a head drive portion 43, a motor drive portion 45, a display control portion 48, an operation processing portion 50, and a USB interface 53 are electrically connected to the CPU 40 via a bus 55.

The ROM 41 stores a control program, initial values and the like that are used to control operations of the printer 30. The RAM 42 temporarily stores various data that are used in the control program, and print image data and the like received from the PC 1. The head drive portion 43 is electrically connected to the ink head 35 that ejects the ink, and drives piezoelectric elements provided in each of ejection channels of the ink head 35. The motor drive portion 45 drives a main scanning motor 46 that moves the ink head 35 in a main scanning direction, and a sub-scanning motor 47 that moves the platen 39 in a sub-scanning direction with respect to the ink head 35. The display control portion 48 controls display of a display 49 in accordance with instructions by the CPU 40. The operation processing portion 50 detects an operation input with respect to an operation portion 51. The USB interface 53 electrically connects the printer 30 to an external device, such as the PC 1.

Figure 3:
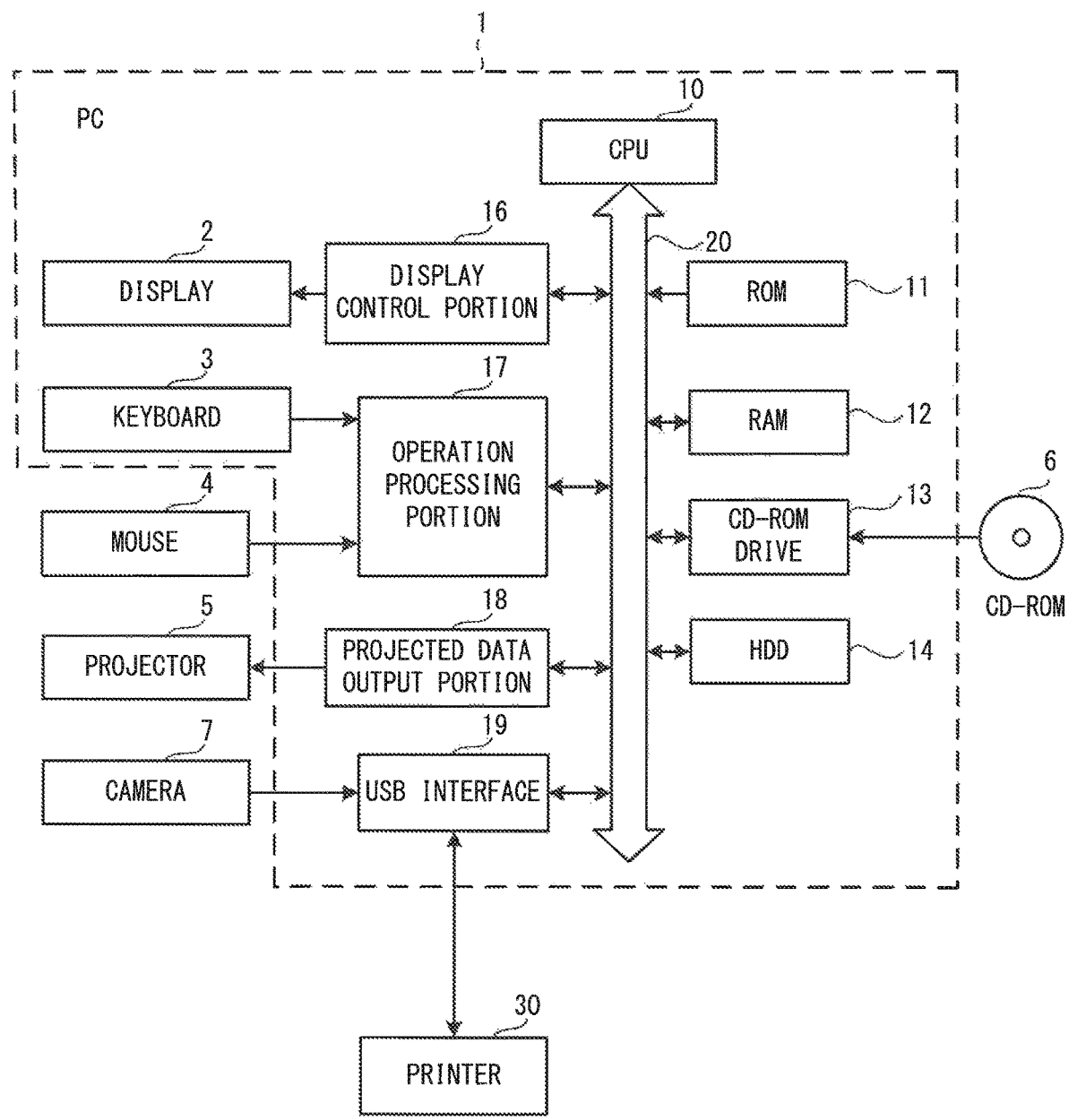
FIG. 3 is a block diagram showing an electrical configuration of a PC 1.

An electrical configuration of the PC 1 will be explained with reference to FIG. 3. The PC 1 is provided with a CPU 10 that controls the PC 1. A ROM 11, a RAM 12, a CD-ROM drive 13, a hard disk drive (hereinafter referred to as an "HDD") 14, a display control portion 16, an operation processing portion 17, a projection data output portion 18, and a USB interface 19, are electrically connected to the CPU 10 via a bus 20.

The ROM 11 stores a program of a BIOS executed by the CPU 10. The RAM 12 temporarily stores various information. A CD-ROM 6 that is a recording medium is inserted into the CD-ROM drive 13. Data recorded on the CD-ROM 6 is read out by the CD-ROM drive 13. Via the CD-ROM 6, the Internet, and the like, the PC 1 acquires a printer driver program, a control program, first to third characteristic point acquisition processing and first to third print image arrangement processing programs, and the like, and stores the programs in the HDD 14. The HDD 14 is a non-volatile recording device, and stores various programs, tables necessary for processing, the print image 60 (refer to FIG. 7A) to be described later, and programs of various processing to be described later. The display control portion 16 controls display of a display 2. The operation processing portion 17 is electrically connected to a keyboard 3 and a mouse 4, and detects an operation input. The projection data output portion 18 is electrically connected to the projector 5 that projects the projection image, and outputs, to the projector 5, the data of the projection image created by the first to third characteristic point acquisition processing and the first to third print image arrangement processing programs. The USB interface 19 electrically connects the PC 1 to external devices, such as the printer 30 and the camera 7, and the like. The CPU 10 receives the photographic image from the camera 7 via the USB interface 19. After the printer 30 receives the data of the print image 60 (refer to FIG. 7A) from the PC 1, when a print start button (not shown in the drawings) is pressed by a user, print processing is performed on the fabric 8 placed on the platen 39.

Figure 4:
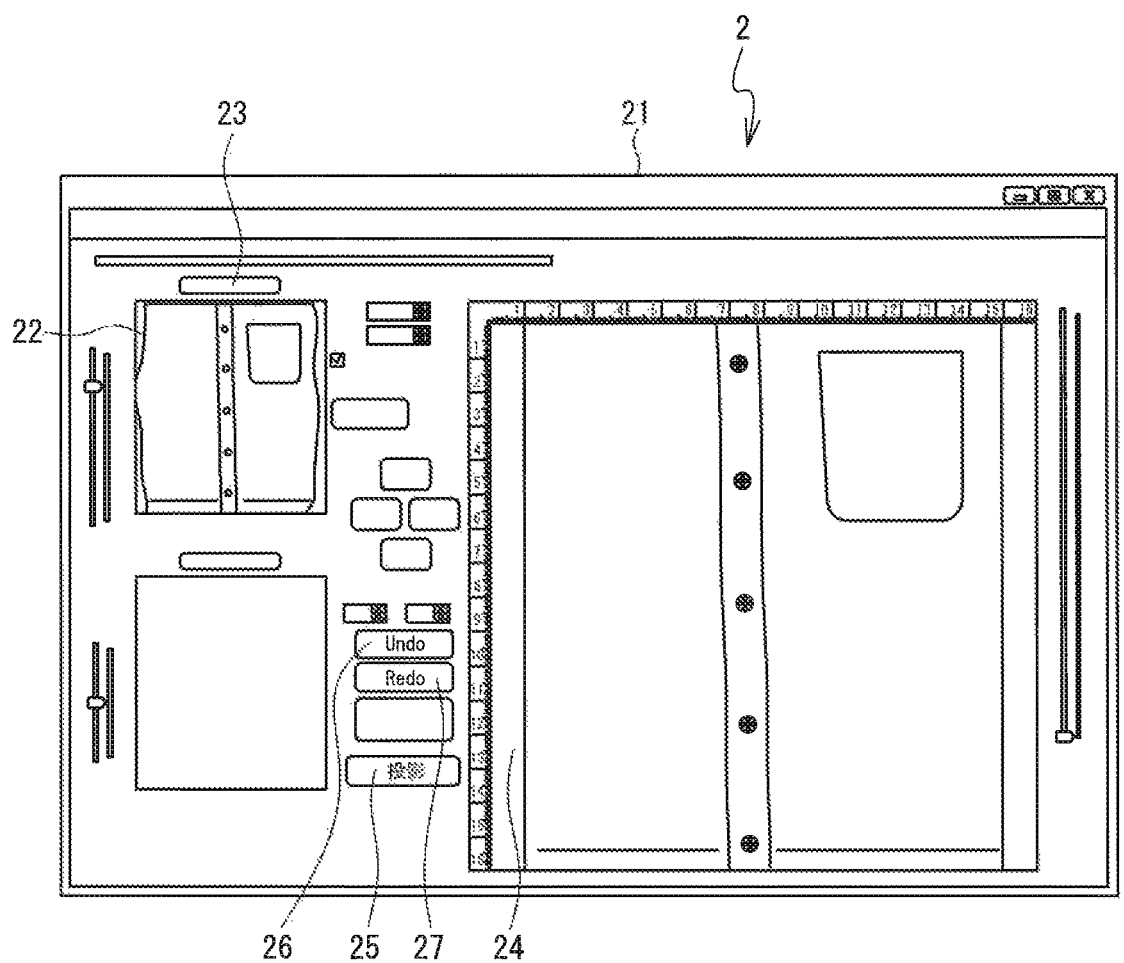
FIG. 4 is a diagram showing an editing screen 21.

As shown in FIG. 4, an editing screen 21 is displayed on the display 2 of the PC 1. A camera image display portion 22 that displays in image input from the camera 7, an image capture button 23 that instructs the camera 7 to perform the image capture and the like, an edit image display portion 24 on which an image being edited is displayed, a projection button 25 that instructs the projector 58 to perform projection, an Undo button 26, a Redo button 27, and the like are displayed on the editing screen 21.

First Embodiment

A first embodiment will be explained below. In the first embodiment, the CPU 10 performs first characteristic point acquisition processing and first print image arrangement processing.

First Characteristic Point Acquisition Processing

The first characteristic point acquisition processing performed by the CPU 10 of the PC 1 will be explained with reference to FIG. 5. In the following example, a T-shirt is used as an example of the fabric 8. First, the user sets the first fabric 8 on the platen 39 of the printer 30.

Figure 6:
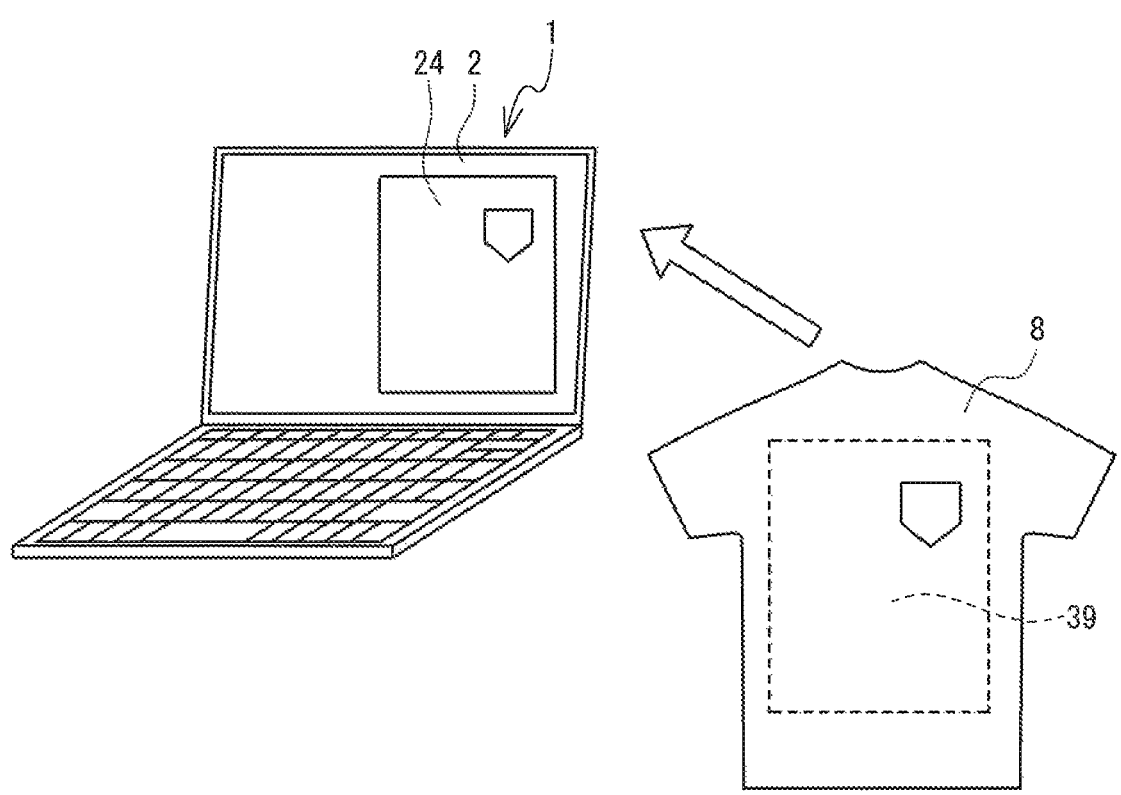
FIG. 6 is a diagram showing display content of a display 2.

When the CPU 10 detects that the image capture button 23 of the editing screen 21 shown in FIG. 4 has been touched (yes at step S1), the CPU 10 determines that there is an image capture command to capture the image of the fabric 8 (yes at step S1), and causes the camera 7 to capture the image of the fabric 8 placed on the platen 39 (step S2). At this time, irradiation from the projector 5 is paused. Next, the CPU 10 acquires the photographic image from the camera 7, and generates a distortion corrected image obtained by performing distortion correction on the photographic image (step S3). Note that the distortion correction processing is performed by image correction processing of a known program library for PC use. Next, as shown in FIG. 6, the CPU 10 displays the photographic image, on which the distortion has been corrected, on the display 2 of the PC 1, as a background image (step S4).

Figure 7A:
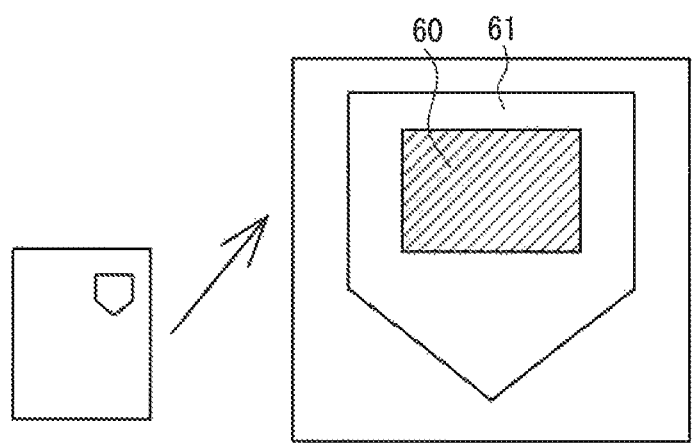
FIG. 7A to FIG. 7D are diagrams showing identification of characteristic points (K, L)
Figure 7B:
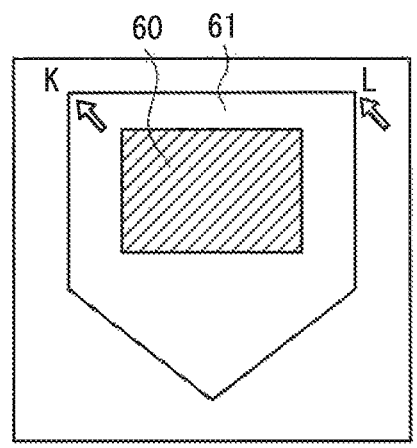

Next, as shown in FIG. 7A, the CPU 10 acquires data of a print image 60 from the HDD 14, and arranges the print image 60 on the background image on the display 2 (step S5). FIG. 7A shows a pocket 61 as a part of the background image. The print image 60 is an image to be printed on the fabric 8 by the printer 30. At this time, the print image 60 is arranged as desired, and thus, the user uses a cursor or the like of the mouse 4 to move and arrange the print image 60 in a desired position on the fabric 8. Next, as shown in FIG. 7B, the user uses the mouse 4 or the like, and selects two characteristic points (K, L) on the screen on the display 2 and specifies the position (step S6). Note that the selection of the characteristic points (K, L) may be performed on the display 2 using a predetermined image such as an arrow input.

Figure 7C:
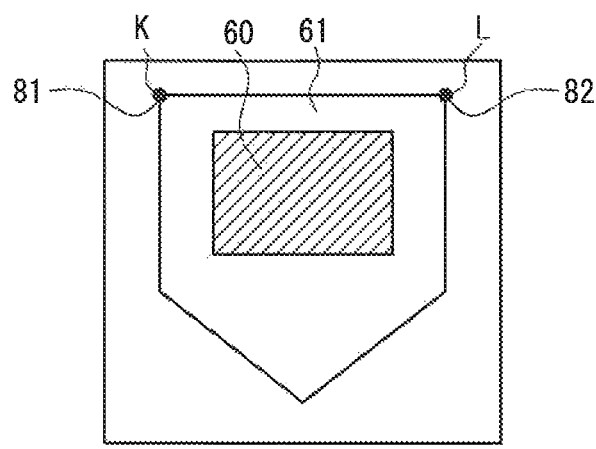

In this case, the characteristic points (K, L) are both corners of an upper portion of the pocket 61 of the fabric 8. The CPU 10 accepts the selection of the selected characteristic points (K, L) (step S6). Processing at step S6, and processing by the CPU 10 to accept the selection using the mouse 4 in processing at step S26, step S46, step S86, and step S107 to be described later correspond to movement input processing. Next, the CPU 10 identifies the planar specific position in the photographic image of the generated graphics based on the position specified in the processing of step S6 or the input predetermined image (step S7). The distortion of the photographic image has been corrected in the process of step S3. The generated graphic is a graphic will be generated in the process of step S8 described later, and the CPU 10 identifies a position where the generated graphic will be generated in advance. For example, the CPU 10 identifies each of coordinates of the positions of the characteristic points (K, L) that are identified planar positions in the photographic image based on the position specified in the process of step S6 or the input predetermined image. Next, based on the coordinates of the characteristic points (K, L), the CPU 10 identifies the coordinates of the generated graphics will be generated that are the planar specific positions in the photographic image. For example, as the coordinates of the characteristic points (K, L) and the generated graphics, X and Y values are identified in the same coordinate system as coordinates on the distortion corrected photographic image. Hereinafter, "coordinates" refers to coordinates in the same system as the coordinates on the distortion corrected photographic image. Next, the CPU 10 generates images of red markers displayed as generated graphics at each of the positions of the characteristic points (K, L) (step S8). Next, as shown in FIG. 7C, the CPU 10 displays red markers 81 and 82 as the generated graphics at the positions of the characteristic points (K, L) (step S9). In the processing at step S9, the CPU 10 performs superimposed display processing that controls the display 2 so as to display the markers 81 and 82, which are the generated graphics superimposed on the photographic image on which the distortion correction has been performed and the print image 60. Next, the CPU 10 acquires the coordinates of the characteristic points (K, L), and stores the acquired coordinates as basic conditions in the RAM 12 (step S11).

Figure 7D:
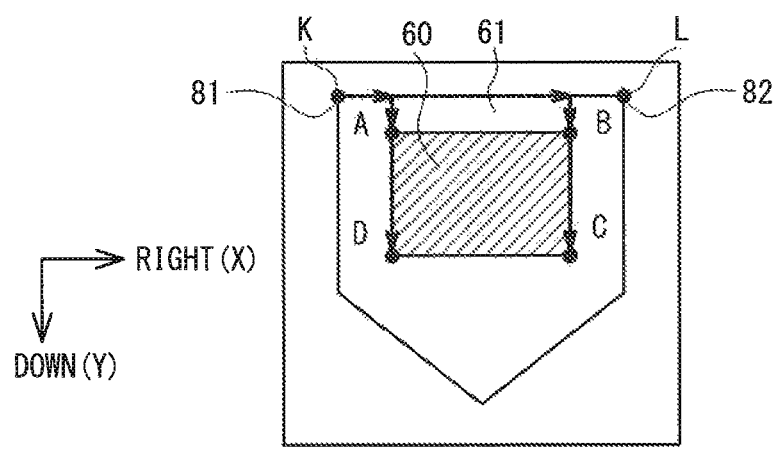

Next, as shown in FIG. 7D, the CPU 10 acquires coordinates of a point A, a point B, a point C, and a point D of four corners of the print image 60 (step S12). Next, the CPU 10 calculates each of parallel translation distances of the point A, the point B, the point C, and the point D with respect to the characteristic point K and stores the distances in the RAM 12 (step S13). The parallel translation distances are distances of each of the point A, the point B, the point C, and the point D with respect to the characteristic point K in the rightward direction (hereinafter referred to as the "X direction") and in the downward direction (hereinafter referred to as the "Y direction"). Next, the print image 60 is projected onto the fabric 8 from the projector 5 (step S14). When the CPU 10 receives a print command (yes at step S15), the CPU 10 transmits, to the printer 30, data of the parallel translation distances of the point A, the point B, the point C, and the point D with respect to the characteristic point K of the print image 60 stored in the RAM 12, along with the data of the print image 60 (step S16). Thus, by the processing at step S16, of the photographic image, the generated graphics, and the print image 60 displayed on the display 2, print content setting processing is performed to set the print content, in the printer 30, for the print image 60 only. Next, the printing on the fabric 8 is performed by the printer 30. When the CPU 10 determines NO in the determination at step S15 and detects an end command (yes at step S17), the CPU 10 ends the first characteristic point acquisition processing.

First Print Image Arrangement Processing

Next, following the first characteristic point acquisition processing, first print image arrangement processing performed by the CPU 10 of the PC 1 will be described with reference to FIG. 8. In the following example, as an example of the second fabric 8, the same fabric T-shirt will be used as the first fabric 8. First, the user sets the second fabric 8 on the platen 39 of the printer 30.

Figure 9A:
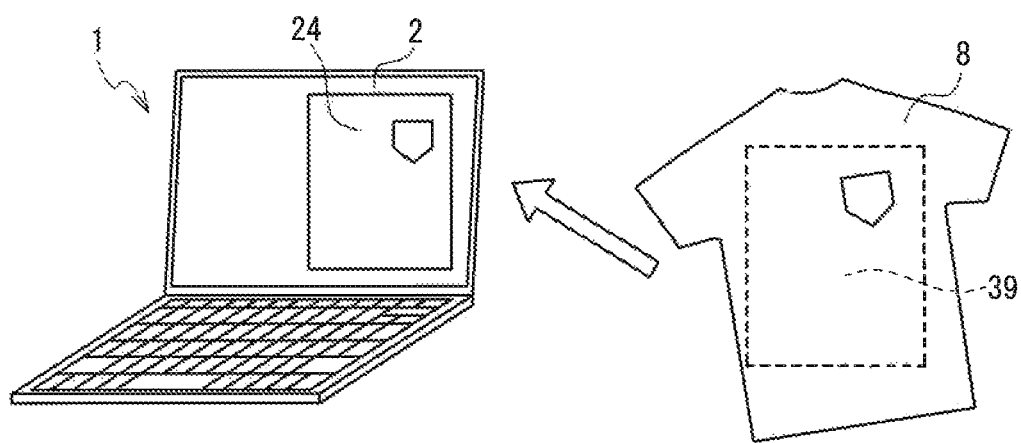
FIG. 9A to FIG. 9D are diagrams showing identification of characteristic points (K2, L2)

When the CPU 10 detects that the image capture button 23 of the editing screen 21 shown in FIG. 4 has been touched (yes at step S21), the CPU 10 determines that there is the image capture command to capture the image of the fabric 8 (yes at step S21), and causes the camera 7 to capture the image of the second fabric 8 placed on the platen 39 (step S22). At this time, the irradiation from the projector 5 is paused. Next, the CPU 10 acquires the photographic image from the camera 7, and generates the distortion corrected image in a similar manner to the processing at step S3 (step S23). Next, as shown in FIG. 9A, the CPU 10 displays the image on which the distortion has been corrected on the display 2 of the PC 1, as the background image (step S24).

Figure 9B:
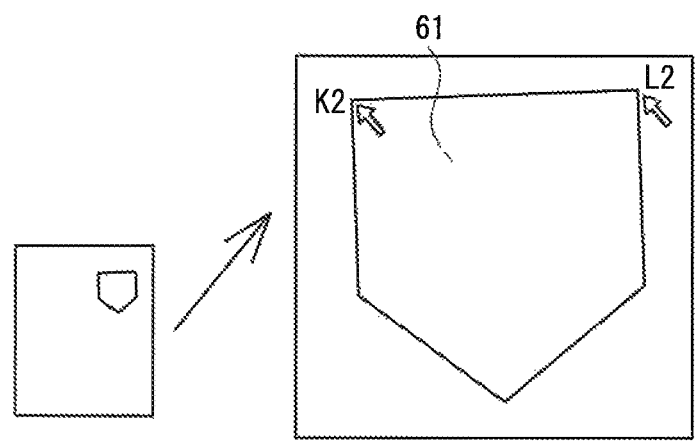
Figure 9C:
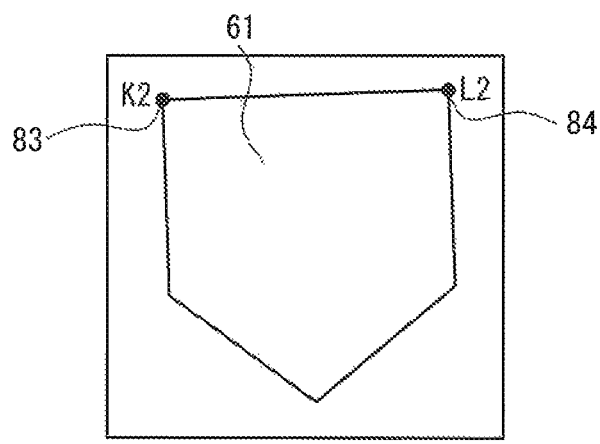

Next, as shown in FIG. 9B, the user uses the mouse 4 or the like to select two characteristic points (K2, L2) on the screen on the display 2. In this case, the characteristic points (K2, L2) are both the corners of the upper portion of the pocket 61 of the fabric 8. The CPU 10 accepts the selection of the selected characteristic points (K2, L2) (step S26). The CPU 10 identifies each of coordinates of positions of the characteristic points (K2, L2) (step S27). Next, the CPU 10 generates an image of red markers 83 and 84 displayed as the generated graphics at each of the positions of the characteristic points (K2, L2) (step S28). Next, as shown in FIG. 9C, the CPU 10 performs the superimposed display processing in the same manner as at step S9, and displays the red markers 83 and 84 as the generated graphics at the positions of the characteristic points (K2, L2) (step S29). Next, the CPU 10 acquires image coordinates of the characteristic points (K2, L2), and stores the acquired coordinates in the RAM 12 (step S31).

Figure 9D:
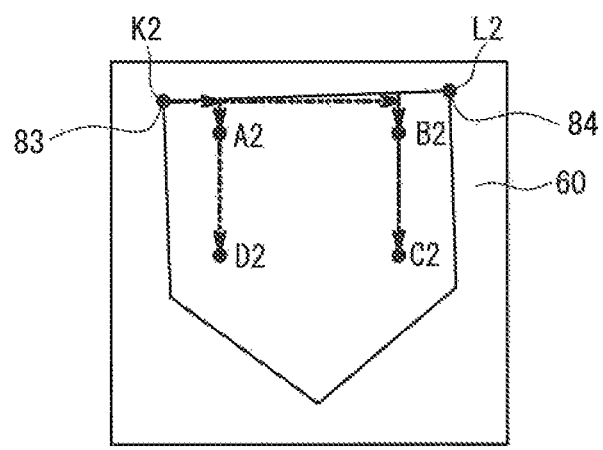
Figure 10A:
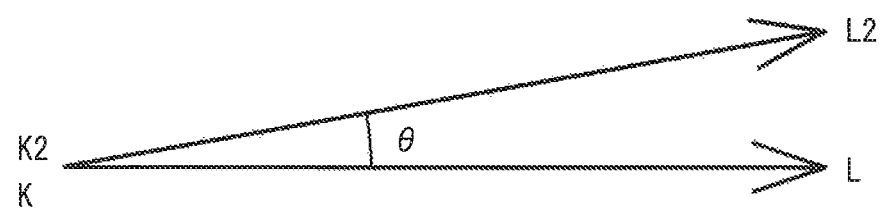
FIG. 10A is a diagram showing an angle θ formed by a vector K2L2 with respect to a vector KL.
Figure 10B:
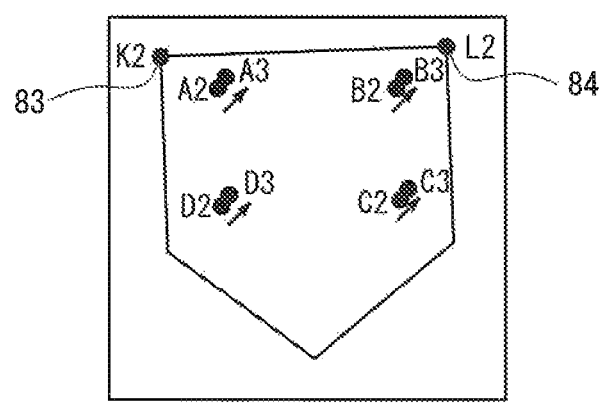
FIG. 10B is a diagram showing values (A3, B3, C3, D3) after rotation by θ around K2.
Figure 10C:
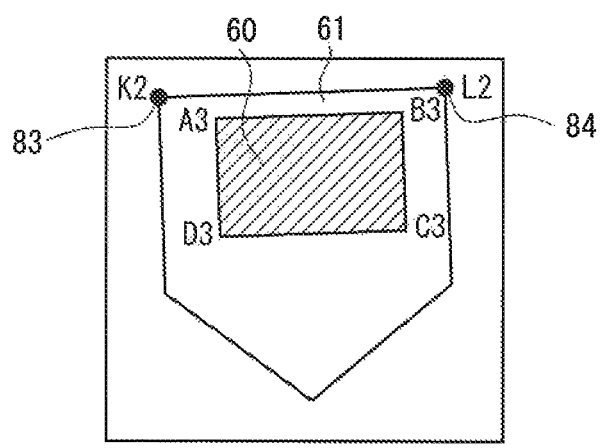
FIG. 10C is a diagram in which a print image 60 is arranged on an image of a pocket 61.

Next, as shown in FIG. 9D, based on the parallel translation distances with respect to K calculated in the processing at step S13 and stored in the RAM 12, the CPU 10 takes K2 as an origin point, and calculates coordinates of four corners (A2, B2, C2, D2) of the image to be arranged (step S32). Next, as shown in FIG. 10A, the CPU 10 acquires the coordinates of the characteristic points (K, L) stored as the basic conditions in the RAM 12 in the processing at step S11, and calculates, in a range of 0<θ<360 degrees, an angle θ formed by a vector K2L2 with respect to a vector KL (step S33). At this time, the CPU 10 limits θ to being a value in the counterclockwise direction. The processing at step S33 corresponds to difference extraction processing. Thus, based on the coordinates (the coordinates of the characteristic points (K, L)) of the generated graphics identified using the basic conditions stored in the RAM 12, as difference extraction processing, the CPU 10 extracts the angle θ formed by the vector of the coordinates (the coordinates of the characteristic points (K2, L2) of the generated graphics generated by the processing at step S28 with respect to the newly captured photographic image. Next, as shown in FIG. 10B, the CPU 10 calculates values (A3, B3, C3, D3) obtained by rotating the coordinates (A2, B2, C2, D2) by θ around K2 (step S34). Next, the CPU 10 arranges the print image 60 on an image of the pocket 61 in line with the coordinates (A3, B3, C3, D3), and displays the print image 60 on the display 2 (step S35). In other words, as shown in FIG. 10C, in the processing at step S35, the CPU 10 sets the generated graphics 83 and 84 and the print image 60 in predetermined relative positions, and displays them on the display 2.

Next, the print image 60 is projected onto the fabric 8 from the projector 5 (step S36). When the CPU 10 receives the print command (yes at step S37), the CPU 10 transmits the data of the print image 60 to the printer 30 (step S38), and, of the photographic image, the generated graphic, and the print image 60 displayed on the display 2, the print content setting processing is performed to set the print content, in the printer 30, for the print image 60 only. Next, the printing on the fabric 8 is performed by the printer 30. When the CPU 10 determines NO in the determination at step S37 and detects an end command (yes at step S39), the CPU 10 ends the first print image arrangement processing.

In the first embodiment, the CPU 10 compares a state stored in advance at the time of printing the first fabric 8, and a state at the time of capturing the image of the second fabric 8 placed on the platen 39 and corrects the position and angle at which the print image 60 is placed. In the above-described example, the pocket 61 is inclined by the angle θ and thus, the print image 60 is also arranged so as to be inclined by an amount corresponding to θ.

Further, in the processing at step S33 of the first print image arrangement processing, if the CPU 10 compares lengths of the vector KL and the vector K2L2, and calculates a scale factor, enlargement/contraction processing of the print image 60 to be arranged becomes possible. For example, taking K2L2=N×KL, the CPU 10 sets the size of the print image 60 as N-fold. Thus, the CPU 10 can perform print image change processing that automatically changes a shape of the print image 60 with respect to characteristics of the fabric 8.

Figure 11:
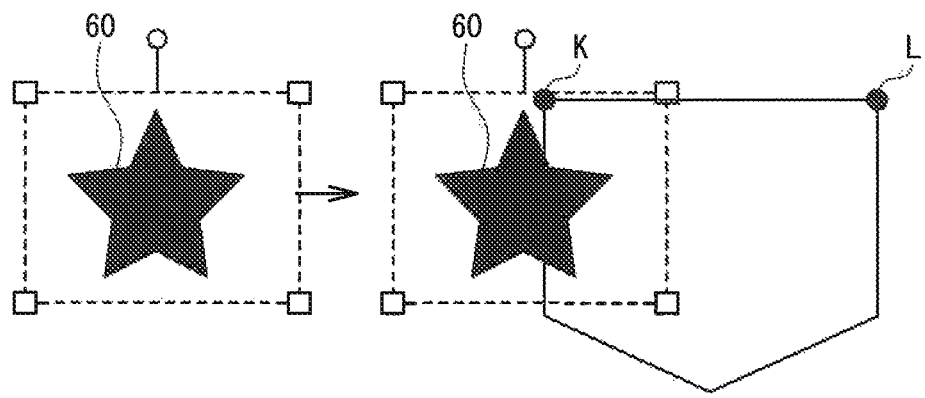
FIG. 11 is a diagram showing a case in which characteristic points do not move even when the print image 60 moves.

As shown in FIG. 11, even if the print image 60 is moved using the mouse 4, the CPU 10 does not move the display of the characteristic points (K, L). During the movement, the print image 60 that is in an upper layer is displayed in priority to the markers of the characteristic points (K, L). Further, the CPU 10 may perform the movement input processing that is input from the mouse 4, which is a command to relatively move at least one of the print image 60 or the markers of the characteristic points (K, L) displayed on the display 2 with respect to the other, and may control the display 2 such that, on the basis of input in the movement input processing, at least one of the print image 60 or the markers of the characteristic points (K, L) is moved.

Below, a second embodiment will be explained. In the second embodiment, the CPU 10 performs second characteristic point acquisition processing and second print image arrangement processing.

Second Characteristic Point Acquisition Processing

The second characteristic point acquisition processing performed by the CPU 10 of the PC 1 will be explained with reference to FIG. 12. First, the user sets the first fabric 8 on the platen 39 of the printer 30.

Figure 5:
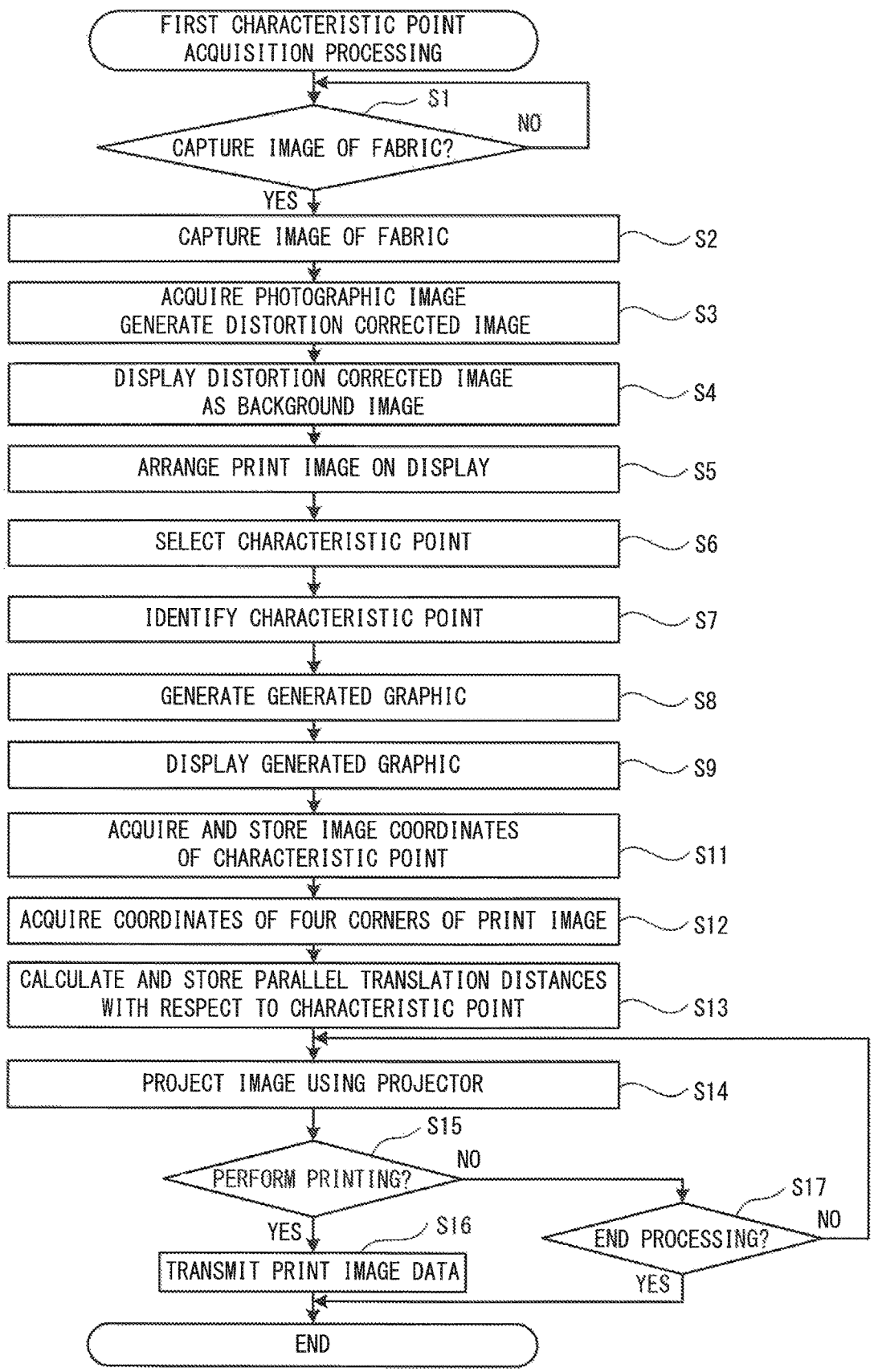
FIG. 5 is a flowchart of first characteristic point acquisition processing.
Figure 12:
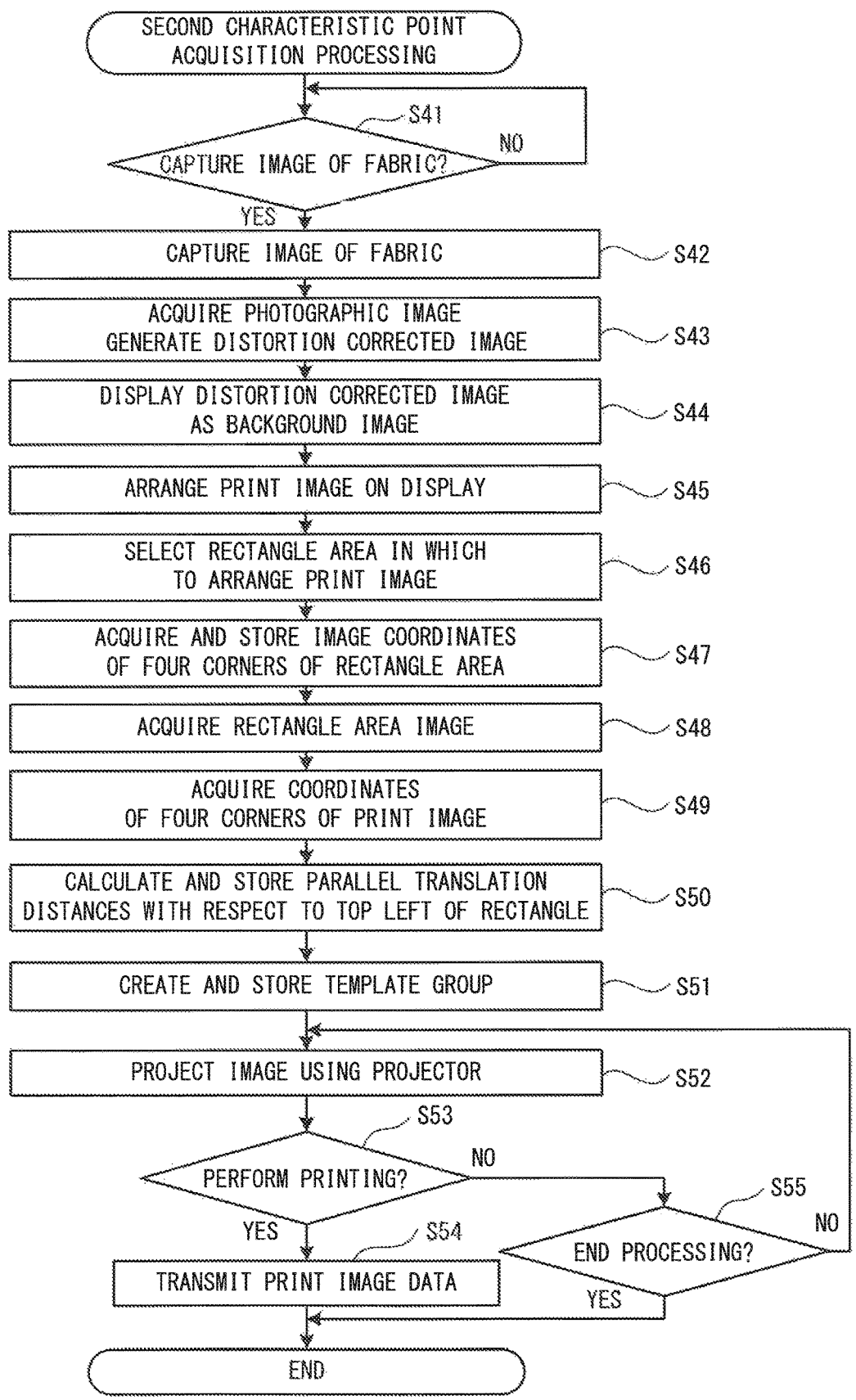
FIG. 12 is a flowchart of second characteristic point acquisition processing.
Figure 13A:
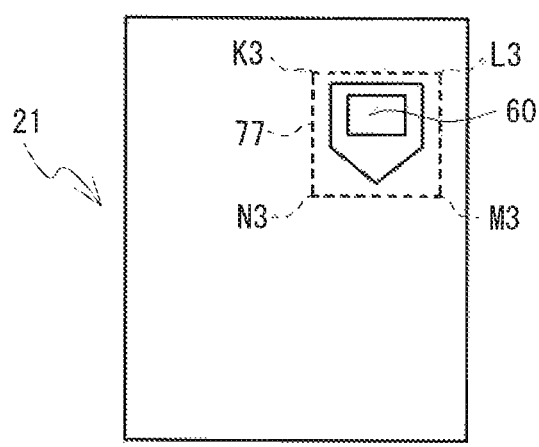
FIG. 13A to FIG. 13B are diagrams showing a cut-out state of an image using a rectangle 77 specified by a user from a background image.
Figure 13B:
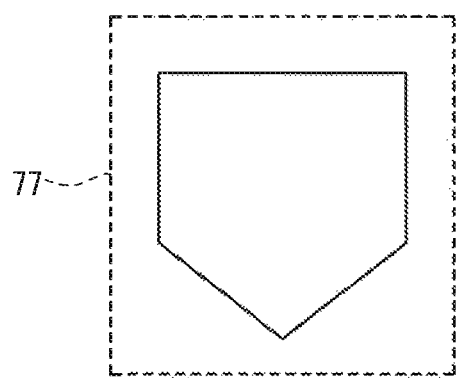

Step S41 to step S46 shown in FIG. 12 are the same as step S1 to step S5 of the first embodiment shown in FIG. 5, and an explanation thereof is thus omitted here. As shown in FIG. 13A, the user uses the mouse 4 or the like to select a region to arrange the image, by a rectangle 77 on the display 2 (step S46). The CPU 10 accepts the region of the selected rectangle 77 (step S46). Next, the CPU 10 acquires coordinates of the four corners of the rectangle 77 specified by the user, as characteristic points (K3, L3, M3, N3), and stores the acquired coordinates in the RAM 12 (step S47). Next, as shown in FIG. 13B, the CPU 10 acquires an image obtained by cutting out the rectangle 77 specified by the user from the background image (step S48).

Figure 13C:
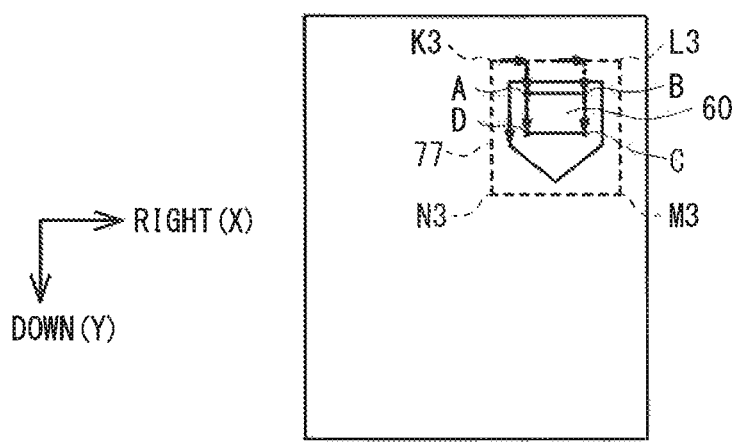
FIG. 13C is a diagram showing a state in which coordinates of the four corners (A, B, C, D) of the print image 60 are obtained.
Figure 14:
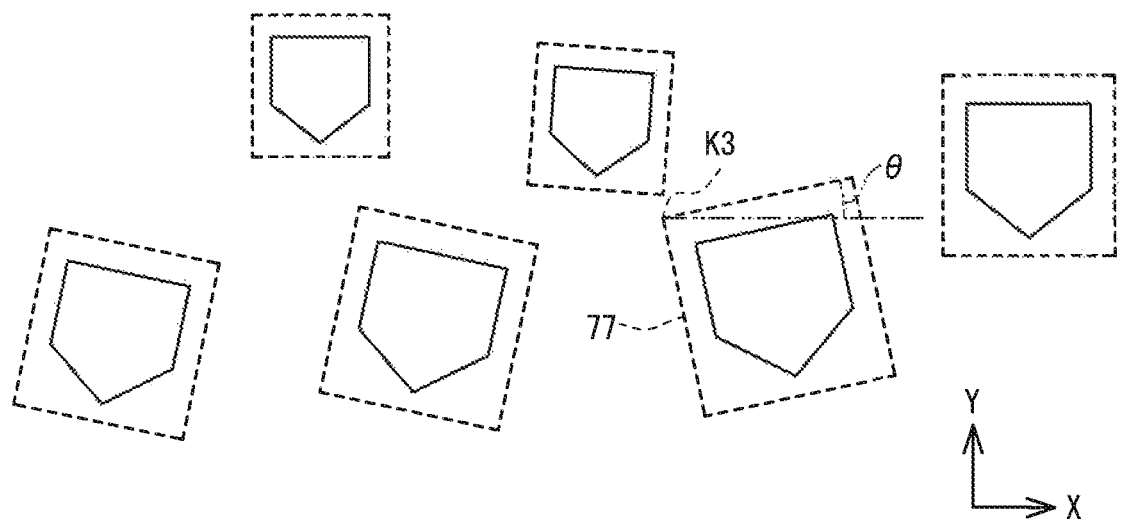
FIG. 14 is a diagram showing a template group.

Next, as shown in FIG. 13C, the CPU 10 acquires coordinates of four corners (A, B, C, D) of the arranged print image 60, in the same image coordinate system as the characteristic points acquired in the processing at step S47 (step S49). Using similar processing to that at step S13, the CPU 10 calculates parallel translation distances of A, B, C, and D with respect to the characteristic point (K3) at the top left of the rectangle 77 selected by the user (step S50) and stores the distances in the RAM 12. Next, as shown in FIG. 14, in addition to the image of the rectangle 77 cut out in the processing at step S48, the CPU 10 automatically generates a plurality of images in which enlargement/reduction processing has been applied to the image of the cut out rectangle 77 or the image has been rotated. The enlargement/reduction processing and the rotation are performed taking a center of the image of the cut out rectangle 77 as a reference. As shown in FIG. 14, an angle of rotation of the rectangle 77 with respect to the X direction around the characteristic point (K3) is the rotation angle θ. As shown in FIG. 14, the CPU 10 sets each of templates as a combination of the generated image and the scale factor/rotation angle θ used at that time, and stores and holds these templates as a template group in the RAM 12 (step S51). Next, the CPU 10 performs processing at step S52 to step S55, which is the same as the processing at step S14 to step S17, and ends the processing.

Second Print Image Arrangement Processing

Figure 15:
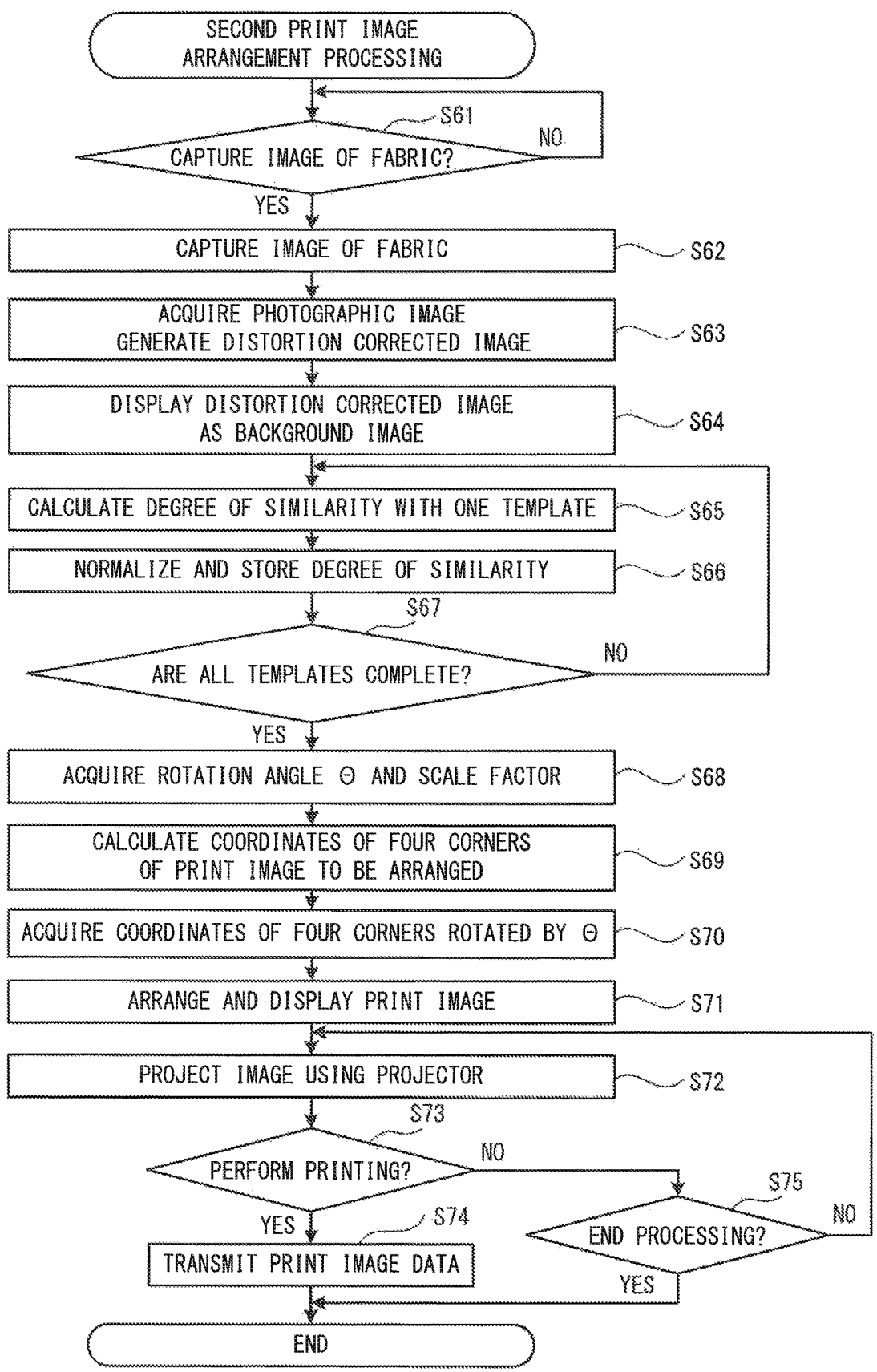
FIG. 15 is a flowchart of second print image arrangement processing.

Next, following the second characteristic point acquisition processing, the second print image arrangement processing performed by the CPU 10 of the PC 1 will be described with reference to FIG. 15. First, the user sets the second fabric 8 on the platen 39 of the printer 30. Step S61 to step S64 shown in FIG. 15 are the same as step S21 to step S24 of the first embodiment shown in FIG. 8, and an explanation thereof is thus omitted here.

Figure 16A:
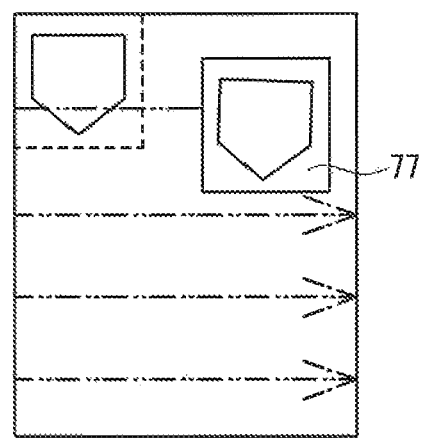
FIG. 16A to FIG. 16D are diagrams showing automatic arranging of the print image 60.

The CPU 10 selects one of the templates from the template group shown in FIG. 14, performs a window scan in the new background image that has been captured by the camera 7 and on which the distortion correction has been performed, and calculates a degree of similarity with the template at respective positions in the background image (step S65). For example, the CPU 10 calculates a difference between pixels in the same position, and if the difference is small, determines that the images are similar. The CPU 10 performs the processing at step S65 using general template matching. In FIG. 16A, the solid line rectangle 77 at the top right is the position at which the degree of similarity is highest. Next, in order to reduce an impact on the degree of similarity by the scale factor, the CPU 10 normalizes the calculated degree of similarity based on the scale factor of the template, and stores the normalized degree of similarity in the RAM 12 (step S66).

Figure 16B:
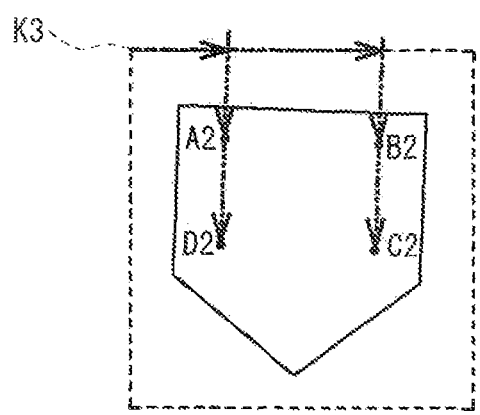
Figure 16C:
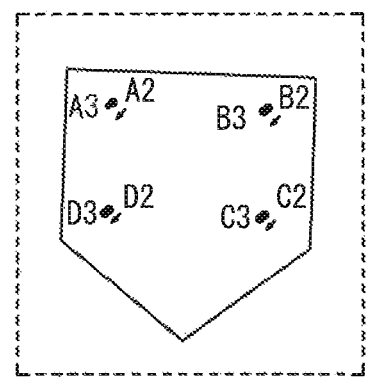
Figure 16D:
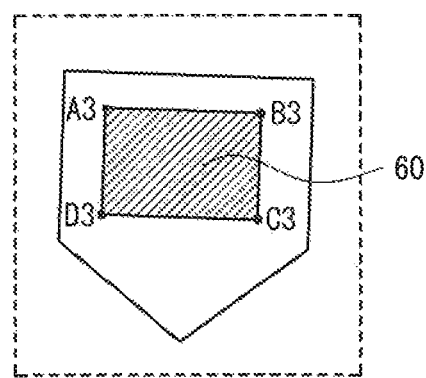

When the CPU 10 has performed the processing at step S65 and step S66 with respect to all of the templates in the template group (yes at step S67), the CPU 10 calculates the position having the highest degree of similarity, and acquires coordinates of that position, and the rotation angle θ and scale factor of the template used (step S68). As shown in FIG. 16B, based on the parallel translation distances calculated by the processing at step S50, the CPU 10 calculates coordinates of four corners (A2, B2, C2, D2) of the image to be arranged (step S69). As shown in FIG. 16C, the CPU 10 rotates the coordinates (A2, B2, C2, D2) around the coordinates calculated at step S68 by the rotation angle θ of the template, and calculates values (A3, B3, C3, D3) when the enlargement/reduction processing has been performed on the image on the basis of the template scale factor (step S70). As shown in FIG. 16D, the CPU 10 arranges the print image 60 in line with the coordinates (A3, B3, C3, D3), and displays the obtained image on the display 2 (step S71). In other words, in the processing at step S71, the CPU 10 performs relative position setting processing to set a predetermined relative position of the generated graphics and the print image 60, and performs display control processing to perform the display on the display 2.

Next, the CPU 10 performs processing at step S72 to step S75, which is the same as the processing at step S36 to step S39, and ends the processing.

Third Embodiment

A third embodiment will be explained below. In the third embodiment, the CPU 10 performs third characteristic point acquisition processing and the second print image arrangement processing.

Third Characteristic Point Acquisition Processing

Figure 17:
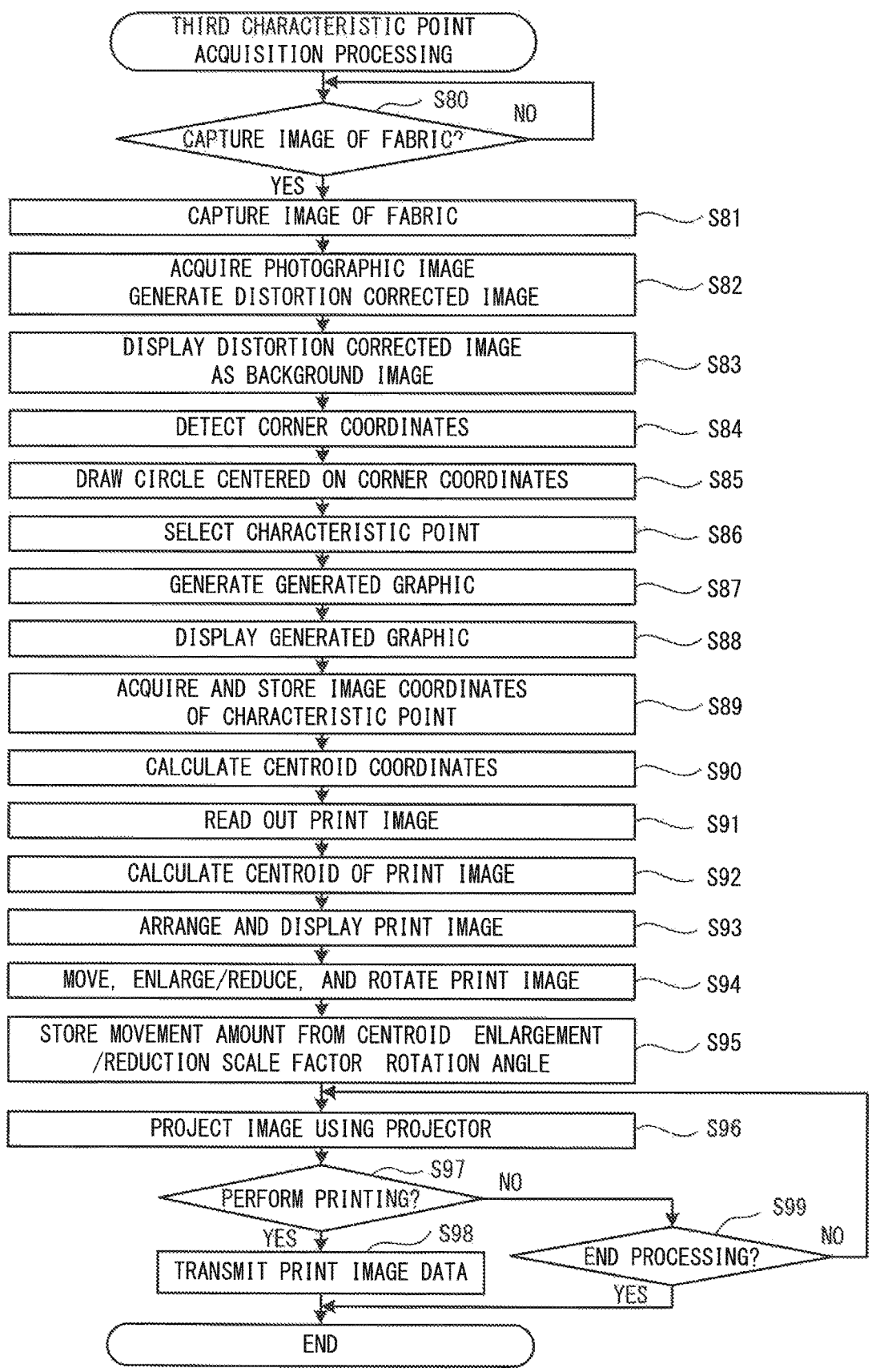
FIG. 17 is a flowchart of third characteristic point acquisition processing.

The third characteristic point acquisition processing performed by the CPU 10 of the PC 1 will be explained with reference to FIG. 17. First, the user sets the first fabric 8 on the platen 39 of the printer 30. Step S80 to step S83 shown in FIG. 17 are the same as step S1 to step S4 of the first embodiment shown in FIG. 5, and an explanation thereof is thus omitted here.

Figure 18A:
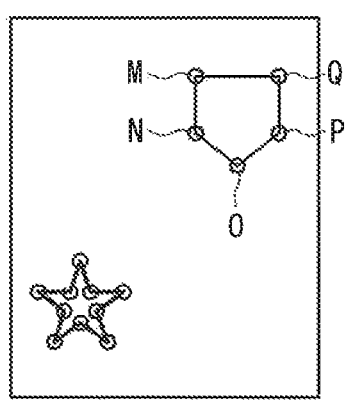
FIG. 18A to FIG. 18C are diagrams showing detection processing of corner coordinates.

The CPU 10 performs corner coordinate detection processing (step S84) of corner coordinates. The corner coordinate detection processing (step S84) will be explained. When the user clicks a corner detection button (not shown in the drawings) of the edit image display portion 24, the CPU 10 starts the corner coordinate detection processing (step S84). The CPU 10 detects a plurality of coordinates that are corners, from the background image. Note that the corner coordinate detection processing (step S84) is performed using a known method, such as the Harris corner detection method, the FAST algorithm, or the like. Next, as shown in FIG. 18A, the CPU 10 draws circles centering on the corner coordinates detected on the background image (step S85). The CPU 10 presents to the user an image in which the circles are drawn on the background image.

Figure 18B:
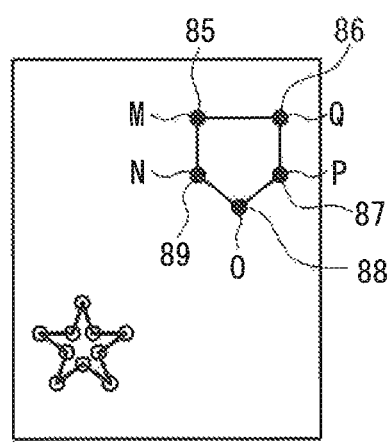

Next, the CPU 10 displays a message on the display 2 prompting selection of corners. The user selects the points that the user wishes to use as characteristic points (5 points, for example) from among the corners on which the presented circles are drawn. As an example, the user uses the mouse 4 or the like and sequentially selects corners (M, N, O, P, Q) on the screen of the display 2. The CPU 10 accepts the selected corners (M, N, O, P, Q) as the characteristic points (step S86). Next, the CPU 10 generates an image of red markers 85 to 89 displayed as the generated graphics of each of the positions of the characteristic points (M, N, O, P, Q) (step S87). Next, as shown in FIG. 18B, the CPU 10 displays the red markers 85 to 89 as the generated graphics of the characteristic points (M, N, O, P, Q) in a similar manner to step S9 (step S88). Next, the CPU 10 acquires image coordinates of the characteristic points (M, N, O, P, Q), and stores the acquired image coordinates in the RAM 12 (step S89).

Figure 18C:
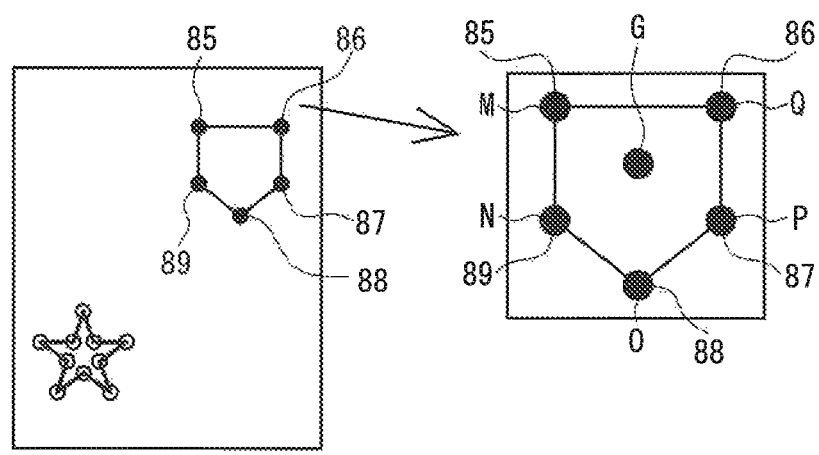
Figure 19A:
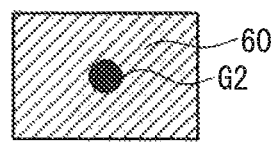
FIG. 19A to FIG. 19C are diagrams showing automatic arranging of a print image 60 using a center of gravity.
Figure 19B:
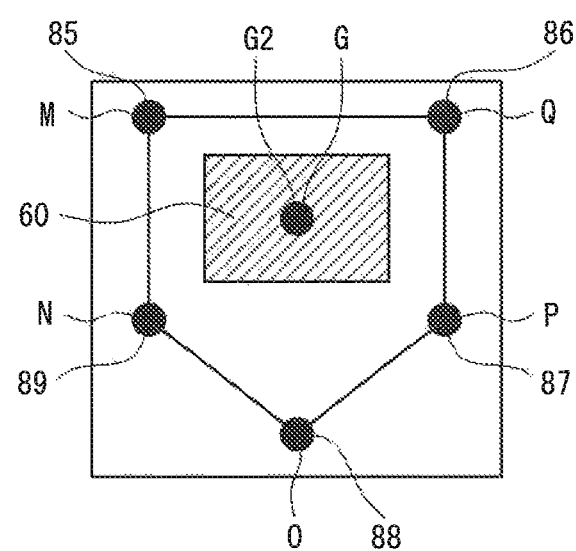
Figure 19C:
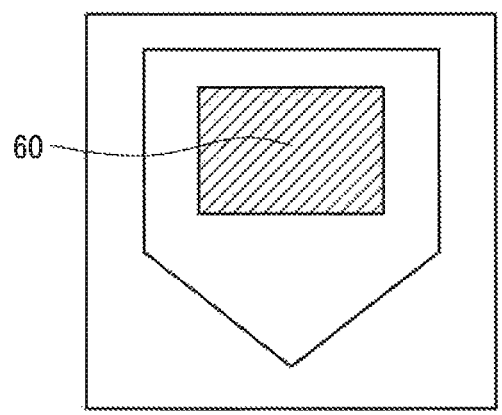

Next, as shown in FIG. 18C, the CPU 10 calculates coordinates of a centroid G of a closed region surrounded by the 5 characteristic points (M, N, O, P, Q) specified by the user (step S90). As a calculation method for the coordinates of the centroid G, the CPU 10 may use a geometrical centroid, or may use a physical centroid. Next, the user selects the print image 60 (refer to FIG. 19A). The CPU 10 reads, from the HDD 14, the print image selected by the user (step S91). The CPU 10 calculates a centroid G2 of the print image (refer to FIG. 19A) (step S92). The calculation method for the centroid G2 is the same as that in the processing at step S90. In other words, the processing at step S90 and step S92 is centroid identification processing. Next, as shown in FIG. 19B, the CPU 10 arranges and displays the print image 60 such that the centroid G of the closed region and the centroid G2 of the print image 60 are aligned with each other (step S93). Therefore, the print image 60 is automatically arranged as shown in FIG. 19C. By dragging the mouse 4, the user adjusts the position of, performs the enlargement/reduction processing to a desired size, and rotates the print image 60 (step S94). Further, in the processing at step S94, the CPU 10 performs relative position setting processing that sets a predetermined relative position between the generated graphics and the print image 60 that has been enlarged or reduced by the enlargement/reduction processing, such that the centroid G of the closed region overlaps with the centroid G2 of the print image 60 that has been enlarged or reduced by the enlargement/reduction processing. The CPU 10 stores a movement amount from the centroid G2 of the print image 60, a scale factor of the enlargement/reduction processing, and a rotation angle in the RAM 12 (step S95). Next, the CPU 10 performs processing at step S96 to step S99, which is the same as the processing at step S14 to step S17.

Third Print Image Arrangement Processing

Next, following the third characteristic point acquisition processing, the third print image arrangement processing performed by the CPU 10 of the PC 1 will be described with reference to FIG. 20. First, the user sets the second fabric 8 on the platen 39 of the printer 30.

Figure 8:
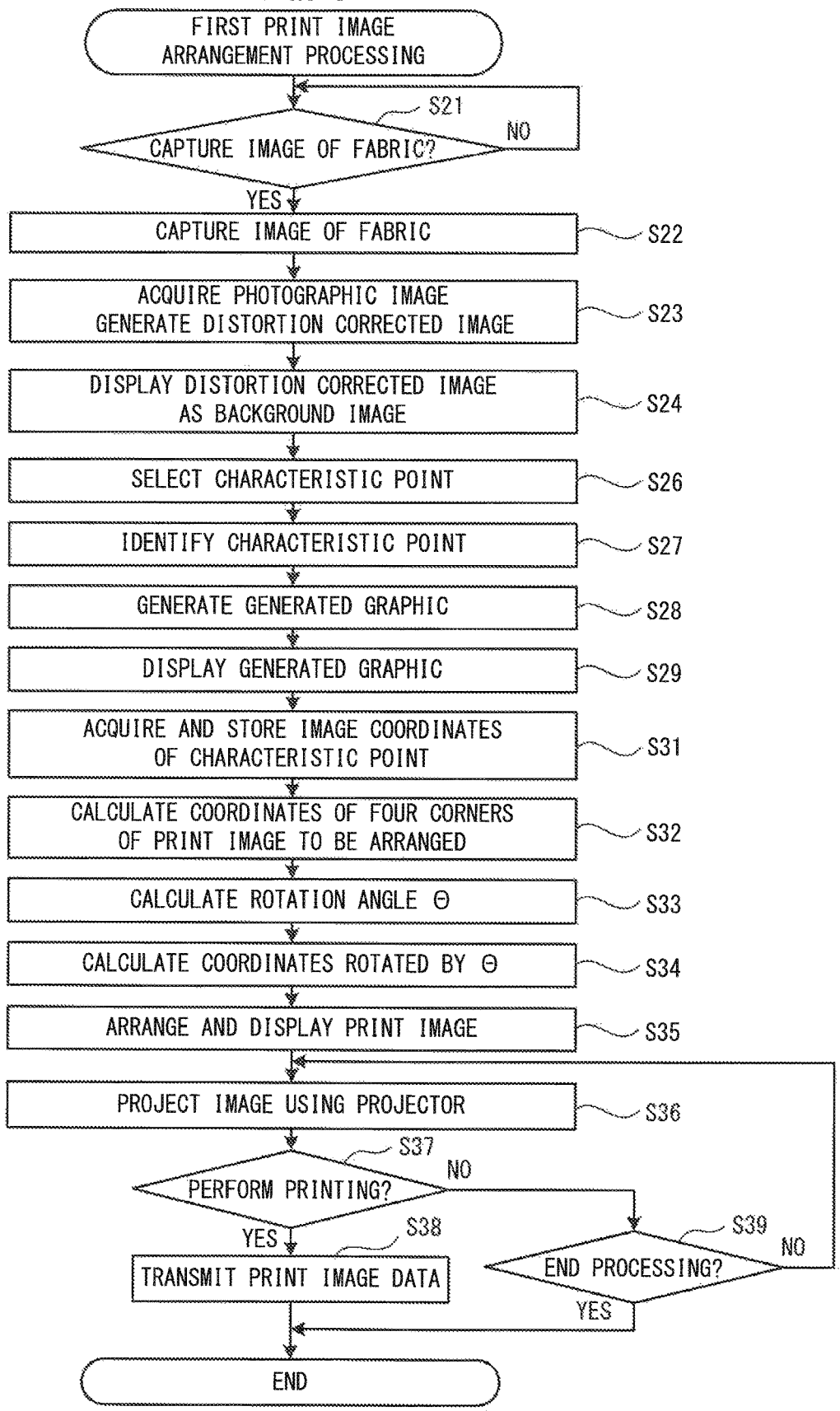
FIG. 8 is a flowchart of first print image arrangement processing.
Figure 20:
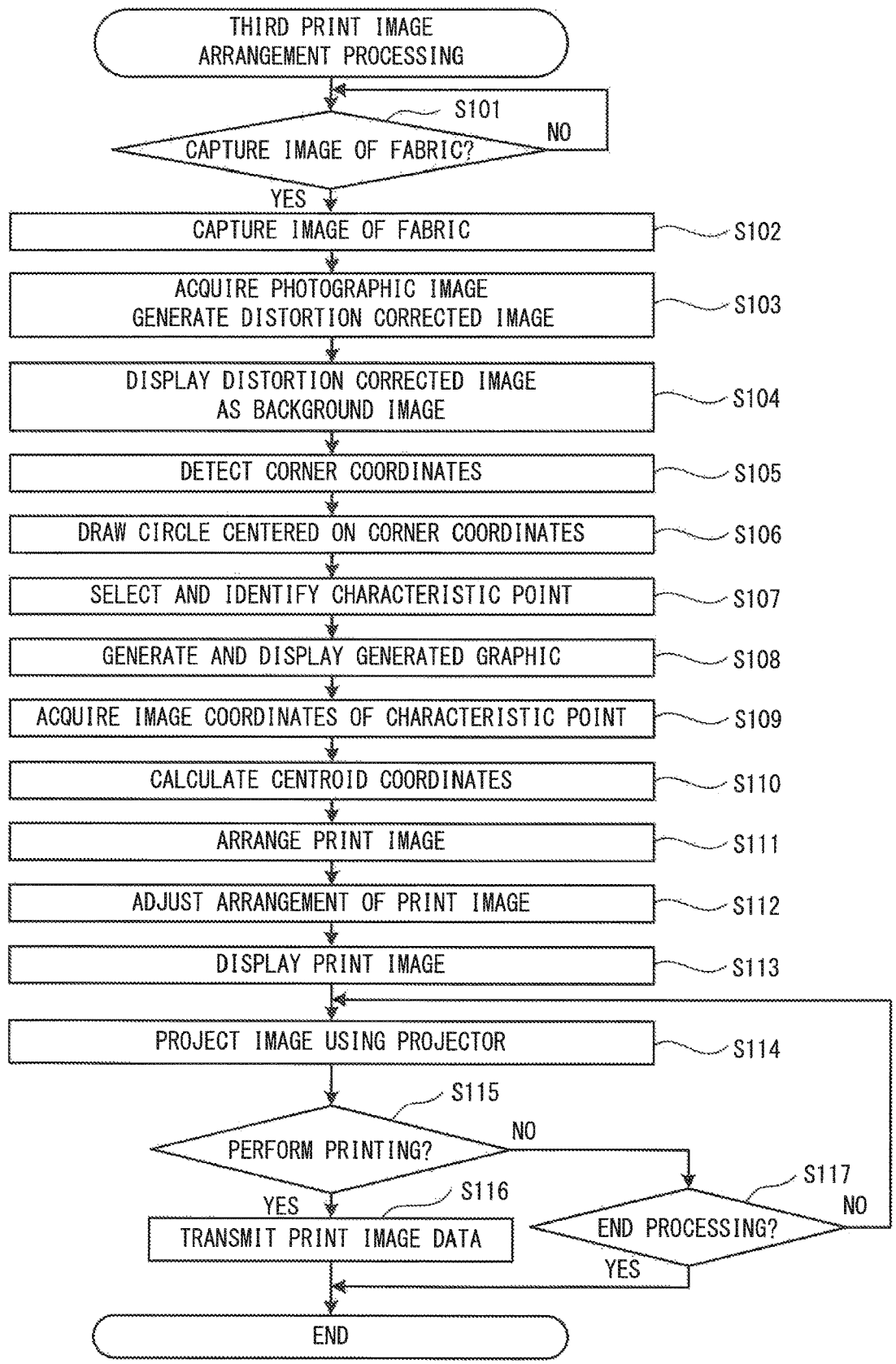
FIG. 20 is a flowchart of third print image arrangement processing.

Step S101 to step S104 shown in FIG. 20 are the same as step S21 to step S24 of the first embodiment shown in FIG. 8 and an explanation thereof is thus omitted here.

The CPU 10 performs the corner coordinate detection processing (step S105). The detection method is the same as at step S84. When the user clicks the corner detection button (not shown in the drawings) of the edit image display portion 24, the CPU 10 starts the corner coordinate detection processing (step S105). The CPU 10 detects a plurality of coordinates that are corners, from the background image. Next, as shown in FIG. 18A, the CPU 10 draws the circles centering on the corner coordinates detected on the background image (step S106). The CPU 10 presents to the user the image in which the circles are drawn on the background image.

Next, the CPU 10 displays the message on the display 2 prompting selection of the corners. The user selects the points that the user wishes to use as characteristic points (5 points, for example) from among the corners on which the presented circles are drawn. The CPU 10 accepts the selected five corners as the characteristic points (M, N, O, P, Q), and the CPU 10 identifies respective coordinates of the positions of the characteristic points (M, N, O, P, Q) (step S107). In other words, by the processing at step S107, the CPU 10 performs confirmation command input processing in which a command is input to confirm the generated graphics displayed by the display 2 as the generated graphics relating to the characteristics of the object to be printed. Next, the CPU 10 generates the image of the red markers 85 to 89 displayed as the generated graphics of each of the positions of the characteristic points (M, N, O, P, Q) (step S108). Next, as shown in FIG. 18B the CPU 10 displays the red markers 85 to 89 as the generated graphics in each of the positions of the characteristic points (M, N, O, P, Q) in a similar manner to step S9 (step S108). Next, the CPU 10 acquires each of image coordinates of the characteristic points, and stores the acquired image coordinates in the RAM 12 (step S109).

Next, the CPU 10 calculates coordinates of the centroid G of the closed region surrounded by the 5 characteristic points specified by the user (step S110). The CPU 10 arranges the print image 60 such that the centroid G of the closed region calculated at step S110 and the centroid G 2 of the print image 60 overlap with each other (step S111). The CPU 10 performs fine adjustment of the arrangement of the print image 60, based on the movement amount, the scale factor, and the rotation angle stored by the processing at step S95 shown in FIG. 17 (step S112). The CPU 10 displays the arranged print image 60 (step S113). Next, the CPU 10 performs processing from step S114 to step S117, which are the same as the processing from step S14 to step S17, and ends the processing.

Operations and Effects of Print System 100 of the Embodiment

Along with the photographic image and the print image 60, the markers relating to the characteristics of the fabric 8 are displayed on the display 2. Thus, the markers become indicators relating to the setting of the position of the print image 60, and the user can easily verify the relative position of the print image 60 with respect to the characteristics of the object to be printed. Thus, even when the object to be printed is configured by the fabric, a deterioration in productivity is reduced. The object to be printed supported by the platen 39 at a stand-by position is separated from the printer 30, and the user can easily perform the verification based on the photographic image, without the printer 30 obstructing the image capture.

The markers are displayed, along with the photographic image and the print image 60, on the basis of positions specified in the photographic image or a predetermined image that has been input. As a result, the relative positions of the photographic image, the print image 60, and the markers can be easily verified and the printing can be performed, and thus, the deterioration in productivity can be reduced.

When the markers are set subsequently in a region of image capture in which the print image 60 is already present, the markers are displayed in priority to the print image 60 that is already present. As a result, the relative positions of the print image 60 with respect to the markers in the photographic image can be easily verified. Thus, the deterioration in productivity can be reduced.

In this case, the markers are confirmed as the characteristics of the object to be printed. Thus, using the display 2, the user can easily and favorably confirm the positional relationship of the object to be printed and the print image 60. The deterioration in productivity can be reduced.

The markers are confirmed as the characteristics of the fabric 8. Using the display 2, the user can easily and favorably verify the positional relationship of the fabric 8 and the print image 60. Thus, the deterioration in productivity can be reduced.

The extracted difference is automatically reflected on the basis of two of the markers, and thus, productivity is increased.

The confirmation of the markers and the extracted difference are automatically reflected, and thus productivity is improved.

The centroid G2 of the print image 60 encompassed by the closed region, and the centroid G of the markers overlap with each other, and, with respect to the setting of the position of the print image 60, the deterioration in productivity can be reduced.

The CPU 10 may perform the print image change processing that automatically changes the shape of the print image 60 with respect to the characteristics of the fabric 8.

In this case, on the basis of some of the markers specified by the user, the position of the print image 60 can be more appropriately set with respect to the characteristics of the fabric 8.

If at least one of the print image 60 or the markers moves relative to the other, the position print image 60 can be even more appropriately set with respect to the characteristics of the fabric 8.

When moving at least one of the print image 60 or the markers relative to the other, the print image 60 is displayed in priority to the markers, and thus, a more appropriate position can be set with respect to the characteristics of the fabric 8.

On the basis of planar positions of extracted related graphics on an image capture surface of the fabric 8 displayed by the display 2, the markers displayed by the display 2 are projected onto the fabric 8 of which the image has been captured by an image capture device, verification operability on the fabric 8 projected by a projection device is improved, and deterioration in productivity is reduced. The fabric 8 supported on the platen 39 in the stand-by position is separated from the printer 30, and the user can easily perform verification on the basis of the projection, without the printer 30 obstructing the projection.

The irradiation of the light onto the fabric 8 by the projector 5 is in a predetermined state, the characteristics of the fabric 8 are identified on the basis of the photographic image, and the markers are displayed. Thus, the deterioration in productivity can be reduced.

In the above-described embodiment, the camera 7 is an example of an "image capture portion" of the present disclosure. The projector 5 is an example of a "projection device" of the present disclosure. The display 2 is an example of a "display portion" of the present disclosure. The CPU 10 is an example of a "control portion" of the present disclosure. The processing at step S6, step S26, step S46, step S86, and step S107 is an example of "part specification command input processing" of the present disclosure. The processing at step S7, step S27, step S47, step S86, and step S107 is an example of "characteristic identification processing" of the present disclosure. The processing at step S8, step S28, and step S87 is an example of "generated graphic generation processing" of the present disclosure. The processing at step S9, step S29, step S88, and step S108 is an example of the "display control processing" and the "superimposed display processing" of the present disclosure. The processing at step S35, step S71, and step S112 is an example of the "relative position setting processing" of the present disclosure. The processing at step S107 is an example of the "confirmation command input processing" of the present disclosure. The processing by which the CPU 10 accepts the selection by the mouse 4 in the processing at step S6, step S26, step S46, step S86, and step S107 is an example of the "movement input processing" of the present disclosure. The mouse 4 is an example of the "movable input device" of the present disclosure.

Figure 21:
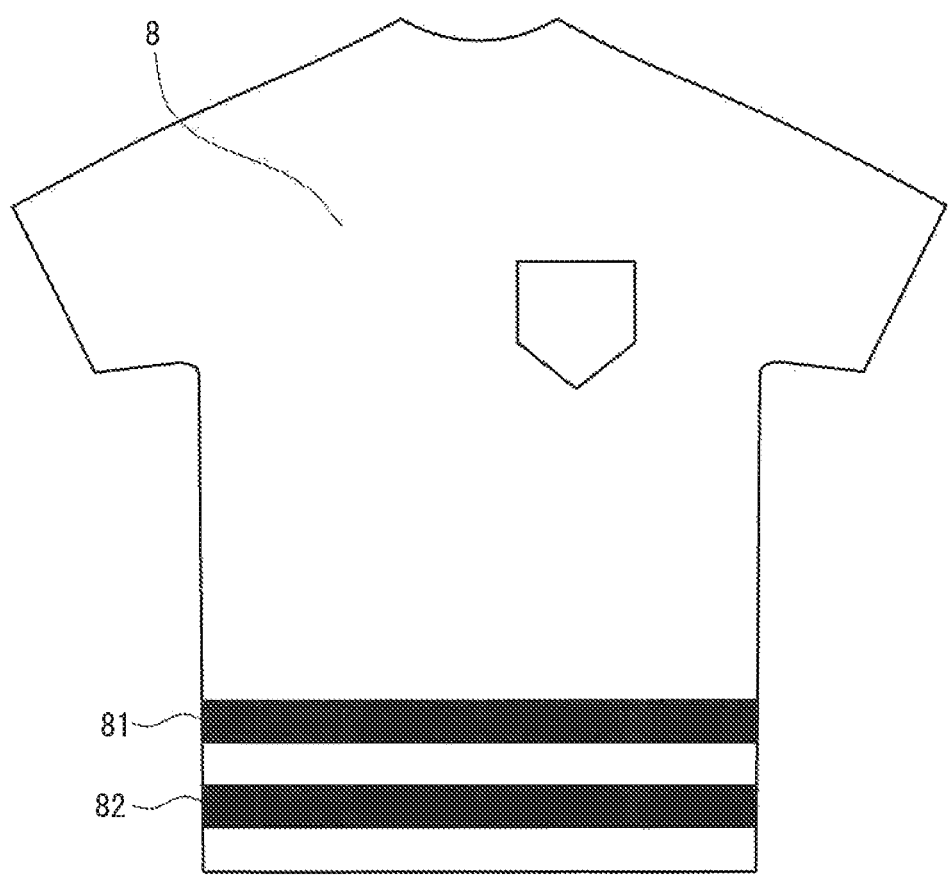
FIG. 21 is a diagram showing a fabric 8 on which red lines are drawn.

Note that the present disclosure is not limited to the above-described embodiment, and various modifications are possible insofar as they do not depart from the gist and scope of the present disclosure. For example, as shown in FIG. 21, when the red lines are on the fabric 8, the CPU 10 may be configured not to extract the characteristic points from a red area. In this case, the CPU 10 may perform design input processing that inputs design information (a color, a pattern, or the like) relating to a photographic image surface of the fabric 8, and may not display the red markers in the generated graphic display (step S88). In other words, in the characteristic identification processing, the CPU 10 may be configured to identify the characteristic of the object to be printed from the photographic image, on the basis of the design information input by the design input processing. Further, of the photographic image, the markers of the generated graphics, and the print image 60 displayed on the display 2, in initial settings, the print content in the printer 30 is set to print only the print image 60. However, a configuration may be adopted in which selection can be made by settings as to which of the images to print. Further, the image capture of the fabric 8 by the camera 7 may be performed in a state in which the light from the projector 5 is a predetermined irradiation on the fabric 8, and not only in the case in which the light from the projector 5 is paused. Further, the "relative position setting processing" may be performed using another method, and not only the method in which the print image 60 is rotated by the rotation angle θ with respect to the characteristic points K, K2, and K3, as in the processing at step S35, step S71, and step S112. For example, a method other than the parallel translation or the like may be performed. Further, in the first to third print image arrangement processing, the respective "relative position setting processing" may be different from each other.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable storage medium storing computer-readable instructions that cause a processor of a print image control device, which sets a print position relating to a print image printed by a printing portion of a printer onto an object to be printed supported by a support member that moves between the print position in which the support member faces the printing portion and a stand-by position in which the support member does not face the printing portion, to perform processes comprising:
    performing part specification command input processing in which a command is input specifying a part of a photographic image captured by an image capture device that captures an image of the object to be printed supported by the support member in the stand-by position;
    performing characteristic identification processing that identifies a characteristic of the object to be printed on the basis of the command input by the part specification command input processing;
    performing generated graphic generation processing that generates a generated graphic relating to the characteristic identified by the characteristic identification processing;
    performing display control processing that displays, on a display portion, the generated graphic generated by the generated graphic generation processing, along with at least one of the photographic image and the print image;
    accepting, in the part specification command input processing, as an input of the command to specify the part of the photographic image, the input of the command to specify in the photographic image a characteristic point of the object to be printed or the command to select in the photographic image a region where a corner becomes the characteristic point to arrange the print image on the object to be printed;
    identifying, in the characteristic identification processing, for the object to be printed, the position of the characteristic point specified by the command input by the part specification command input processing; and
    generating, in the generated graphic generation processing, the generated graphic at the position of the characteristic point identified by the characteristic identification processing.

2. The non-transitory computer-readable medium storing computer-readable instructions according to claim 1, further causing the processor to perform processes comprising:
    performing print content setting processing that, of the photographic image, the generated graphic, and the print image displayed on the display portion, sets only the print image as print content in the printer.

3. The non-transitory computer-readable medium storing computer-readable instructions according to claim 1, further causing the processor to perform a process comprising:
    performing superimposed display processing that, in the display control processing, displays, on the display portion, the generated graphic superimposed on the photographic image and the print image.

4. The non-transitory computer-readable medium storing computer-readable instructions according to claim 1, further causing the processor to perform processes comprising:
    performing relative position setting processing that sets a predetermined relative position of the generated graphic and the print image; and
    displaying, on the display portion, the generated graphic along with the print image, on the basis of the relative position set by the relative position setting processing.

5. The non-transitory computer-readable medium storing computer-readable instructions according to claim 4, further causing the processor to perform processes comprising:
    performing confirmation command input processing in which a command is input to confirm the generated graphic displayed on the display portion as the generated graphic relating to the characteristic of the object to be printed;
    setting, in the relative position setting processing, the print image in the predetermined relative position with respect to the generated graphic for which the command to confirm is input by the confirmation command input processing; and,
    displaying, on the display portion, the generated graphic for which the command to confirm is input by the confirmation command input processing, along with the print image, on the basis of the relative position set by the relative position setting processing.

6. The non-transitory computer-readable medium storing computer-readable instructions according to claim 5, further causing the processor to perform processes comprising:
    performing difference extraction processing that extracts a difference, with respect to the photographic image that is newly captured, of the generated graphic that is generated by the generated graphic generation processing, on the basis of coordinates of the generated graphic identified by a basic condition stored in a basic condition storage portion that stores, as the basic condition, the coordinates of the generated graphic;
    setting, in the relative position setting processing, the print image and the generated graphic generated by the generated graphic generation processing on the basis of the characteristic of the photographic image to the predetermined relative position, on the basis of the difference extracted by the difference extraction processing; and
    displaying, on the display portion, the generated graphic along with the print image, on the basis of the difference extracted by the difference extraction processing and the relative position set by the relative position setting processing.

7. The non-transitory computer-readable medium storing computer-readable instructions according to claim 6, further causing the processor to perform processes comprising:
   accepting, in the confirmation command input processing, an input of a command to confirm the generated graphic, which is displayed on the display portion and which is based on the difference extracted by the difference extraction processing, as the generated graphic relating to the characteristic of the object to be printed;
   setting, in the relative position setting processing, the predetermined relative position of the print image with respect to the generated graphic, which is based on the difference extracted by the difference extraction processing and for which the command to confirm is input by the confirmation command input processing; and
   displaying, on the display portion along with the print image, the generated graphic, which is based on the difference extracted by the difference extraction processing and for which the command to confirm is input by the confirmation command input processing, on the basis of the relative position set in the relative position setting processing.

8. The non-transitory computer-readable medium storing computer-readable instructions according to claim 4, further causing the processor to perform processes comprising:
   performing enlargement/reduction processing that, when the print image is encompassed by a closed region as a characteristic identified by the characteristic identification processing, one of enlarges and reduces the print image encompassed by the closed region, on the basis of a size of the closed region;
   performing centroid identification processing that identifies a centroid of the closed region, and a centroid of the print image that is one of enlarged and reduced by the enlargement/reduction processing; and
   in the relative position processing, causing the centroid of the closed region and the centroid of the print image that is one of enlarged and reduced by the enlargement/reduction processing to be superimposed on each other, and setting, in the predetermined relative position, the generated graphic and the print image that is one of enlarged and reduced by the enlargement/reduction processing.

9. The non-transitory computer-readable medium storing computer-readable instructions according to claim 1, further causing the processor to perform a process comprising:
   performing print image change processing that automatically changes a shape of the print image with respect to the characteristic of the object to be printed.

10. The non-transitory computer-readable medium storing computer-readable instructions according to claim 1, further causing the processor to perform processes comprising:
   performing design input processing that inputs design information relating to a design of an image capture surface of the object to be printed; and
   identifying, in the characteristic identification processing, the characteristic of the object to be printed from the photographic image on the basis of the design information input by the design input processing.

11. The non-transitory computer-readable medium storing computer-readable instructions according to claim 1, further causing the processor to perform processes comprising:
   performing movement input processing in which, in the part specification command input processing, a command is input from a movable input device to specify a part of the generated graphic displayed by the display portion.

12. The non-transitory computer-readable medium storing computer-readable instructions according to claim 11, further causing the processor to perform processes comprising:
   moving at least one of the print image and the generated graphic on the basis of the input by the movement input processing, and controlling the display portion.

13. The non-transitory computer-readable medium storing computer-readable instructions according to claim 12, wherein
   when moving at least one of the print image and the generated graphic on the basis of the input of the movement input processing, the display portion is controlled such that a display position of the generated graphic on the display portion is maintained, and the print image is displayed in priority to the generated graphic.

14. The non-transitory computer-readable medium storing computer-readable instructions according to claim 1, further causing the processor to perform a process comprising:
   causing a projection device, which is provided facing the support member on which the object to be printed is placed in the stand-by position, to project the print image displayed on the display portion onto the object to be printed.

15. The non-transitory computer-readable medium storing computer-readable instructions according to claim 14, further causing the processor to perform processes comprising:
   causing the image capture device to capture an image of the object to be printed, in a state in which light from the projection device is one of a predetermined irradiation and paused; and
   extracting, in the characteristic identification processing, the characteristic on the basis of the photographic image.

16. A print image control device that sets a print position relating to a print image printed by a printing portion of a printer onto an object to be printed supported by a support member that moves between the print position in which the support member faces the printing portion and a stand-by position in which the support member does not face the printing portion, the print image control device comprising:
   a control portion,
   wherein
   the control portion performs processes comprising:
      performing part specification command input processing in which a command is input specifying a part of a photographic image captured by an image capture device that captures an image of the object to be printed supported by the support member in the stand-by position;
      performing characteristic identification processing that identifies a characteristic of the object to be printed on the basis of the command input by the part specification command input processing;
      performing generated graphic generation processing that generates a generated graphic relating to the characteristic identified by the characteristic identification processing;
      performing display control processing that displays, on a display portion, the generated graphic generated by the generated graphic generation processing, along with at least one of the photographic image and the print image;

accepting, in the part specification command input processing, as an input of the command to specify the part of the photographic image, the input of the command to specify in the photographic image a characteristic point of the object to be printed or the command to select in the photographic image a region where a corner becomes the characteristic point to arrange the print image on the object to be printed;

identifying, in the characteristic identification processing, for the object to be printed, the position of the characteristic point specified by the command input by the part specification command input processing; and generating, in the generated graphic generation processing, the generated graphic at the position of the characteristic point identified by the characteristic identification processing.

17. A control method of a print image control device that sets a print position relating to a print image printed by a printing portion of a printer onto an object to be printed supported by a support member that moves between the print position in which the support member faces the printing portion and a stand-by position in which the support member does not face the printing portion, the control method performing processes comprising:

performing part specification command input processing in which a command is input specifying a part of a photographic image captured by an image capture device that captures an image of the object to be printed supported by the support member in the stand-by position;

performing characteristic identification processing that identifies a characteristic of the object to be printed on the basis of the command input by the part specification command input processing;

performing generated graphic generation processing that generates a generated graphic relating to the characteristic identified by the characteristic identification processing;

performing display control processing that displays, on a display portion, the generated graphic generated by the generated graphic generation processing, along with at least one of the photographic image and the print image;

accepting, in the part specification command input processing, as an input of the command to specify the part of the photographic image, the input of the command to specify in the photographic image a characteristic point of the object to be printed or the command to select in the photographic image a region where a corner becomes the characteristic point to arrange the print image on the object to be printed;

identifying, in the characteristic identification processing, for the object to be printed, the position of the characteristic point specified by the command input by the part specification command input processing; and generating, in the generated graphic generation processing, the generated graphic at the position of the characteristic point identified by the characteristic identification processing.

* * * * *